Oct. 17, 1944. P. C. PUTNAM 2,360,791
WIND TURBINE
Filed March 22, 1941 31 Sheets-Sheet 1

Inventor:
Palmer Cosslett Putnam
by his Attorneys
Howson & Howson

Oct. 17, 1944.  P. C. PUTNAM  2,360,791
WIND TURBINE
Filed March 22, 1941  31 Sheets—Sheet 5

Oct. 17, 1944.  P. C. PUTNAM  2,360,791
WIND TURBINE
Filed March 22, 1941   31 Sheets-Sheet 6

Inventor:
Palmer Cosslett Putnam
by his Attorneys
Howson & Howson

Oct. 17, 1944.                P. C. PUTNAM                 2,360,791
                                WIND TURBINE
                       Filed March 22, 1941      31 Sheets-Sheet 8

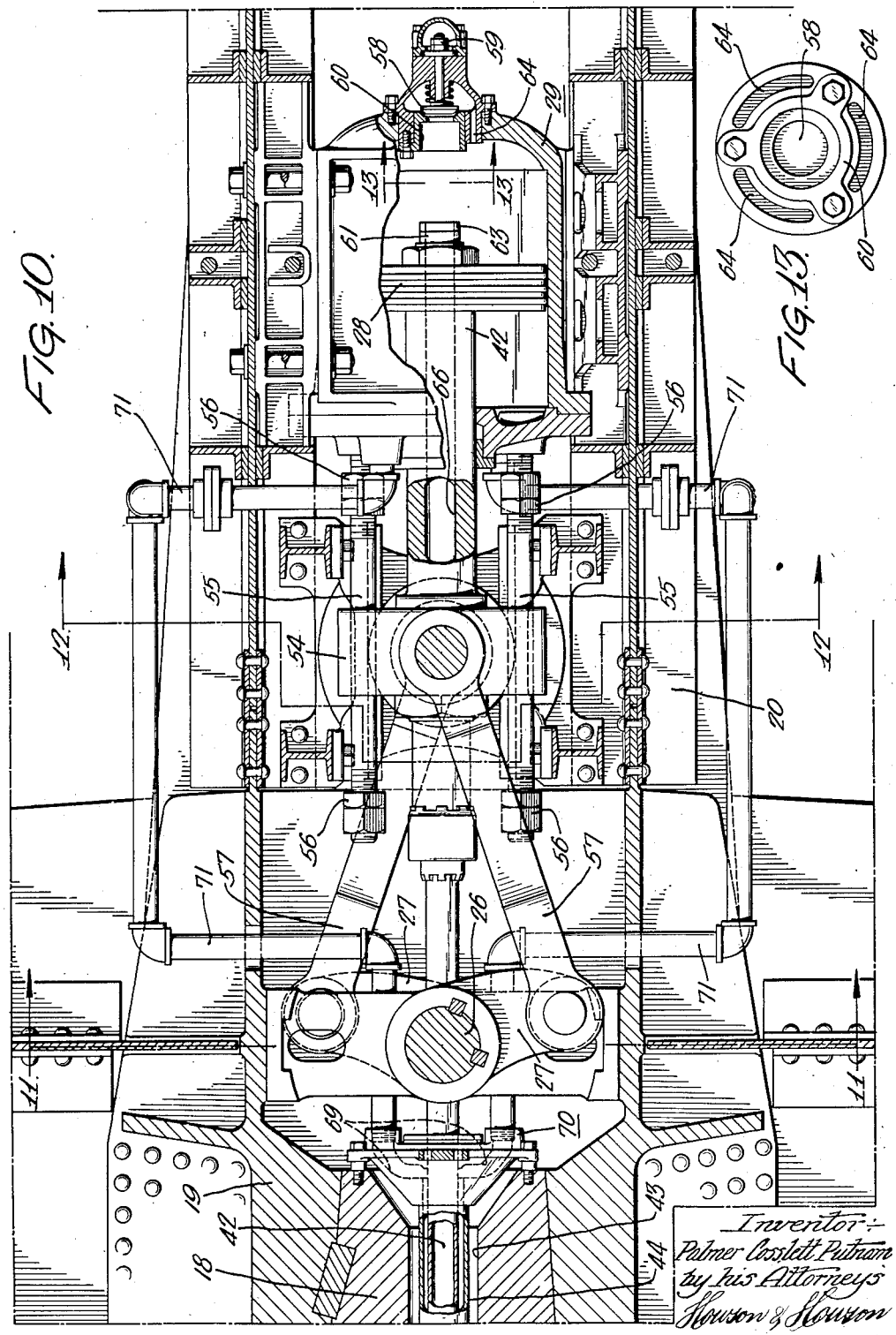

Oct. 17, 1944.     P. C. PUTNAM     2,360,791
WIND TURBINE
Filed March 22, 1941     31 Sheets-Sheet 10

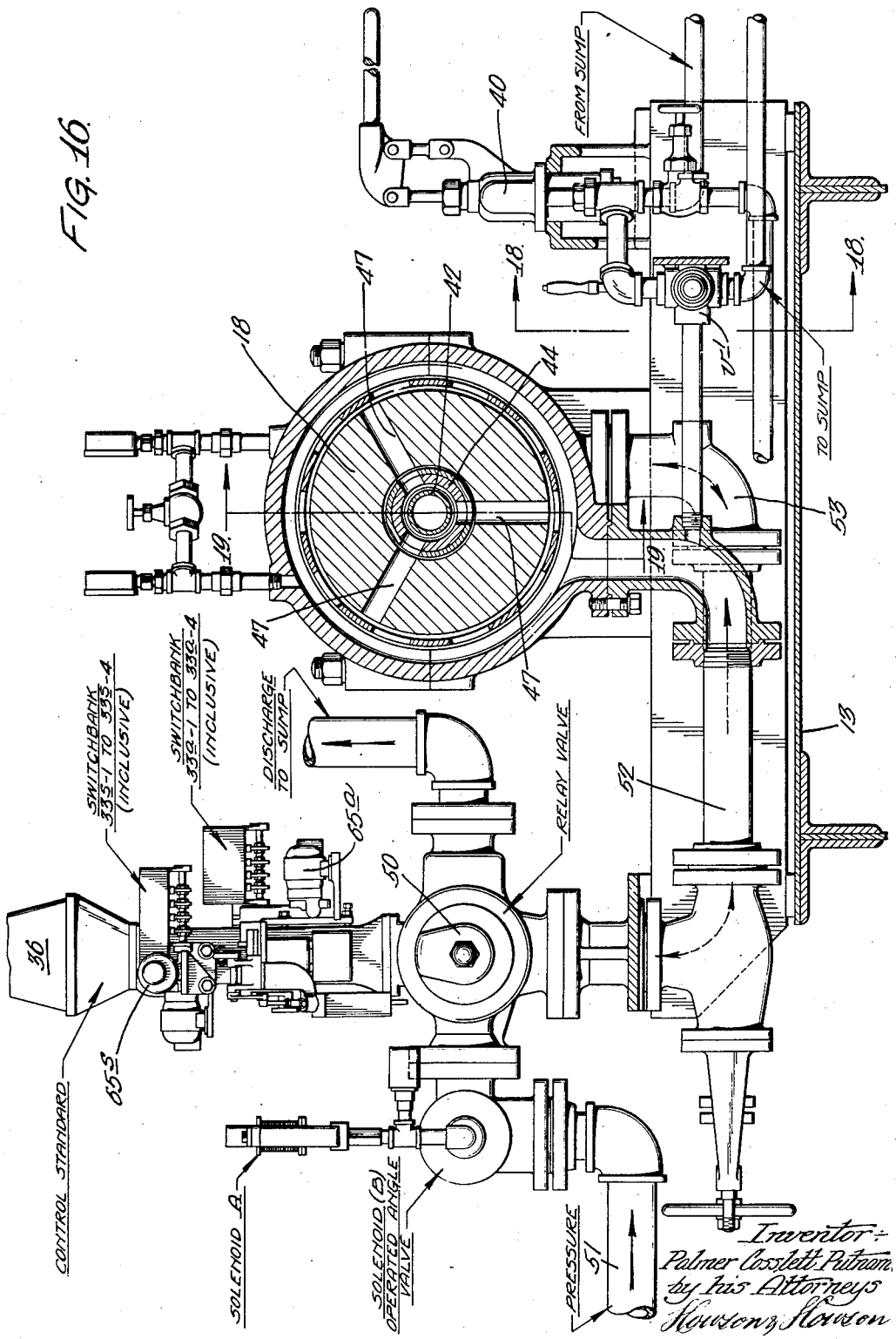

Oct. 17, 1944.   P. C. PUTNAM   2,360,791
WIND TURBINE
Filed March 22, 1941   31 Sheets-Sheet 13
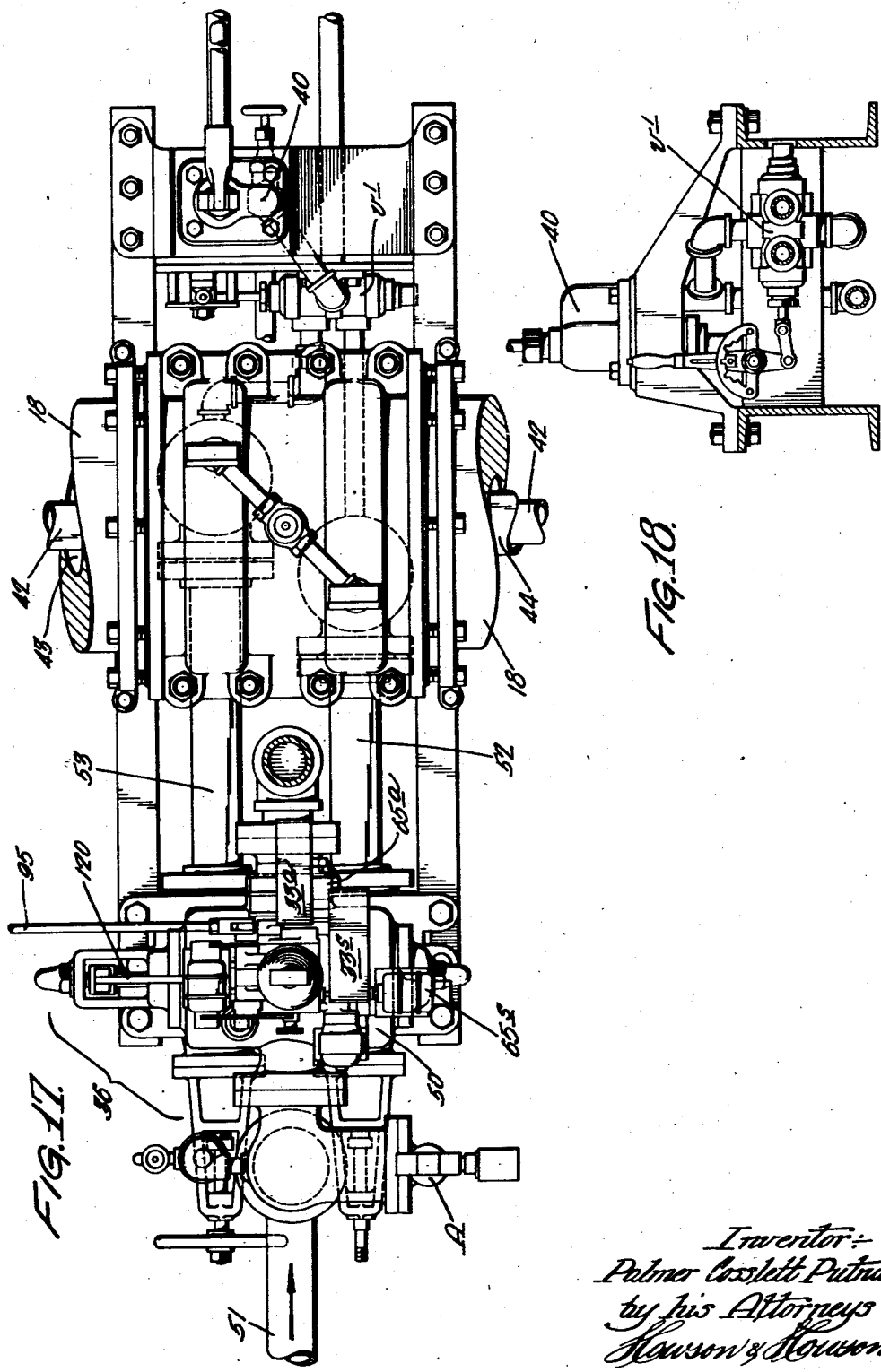
Inventor:-
Palmer Cosslett Putnam
by his Attorneys
Howson & Howson

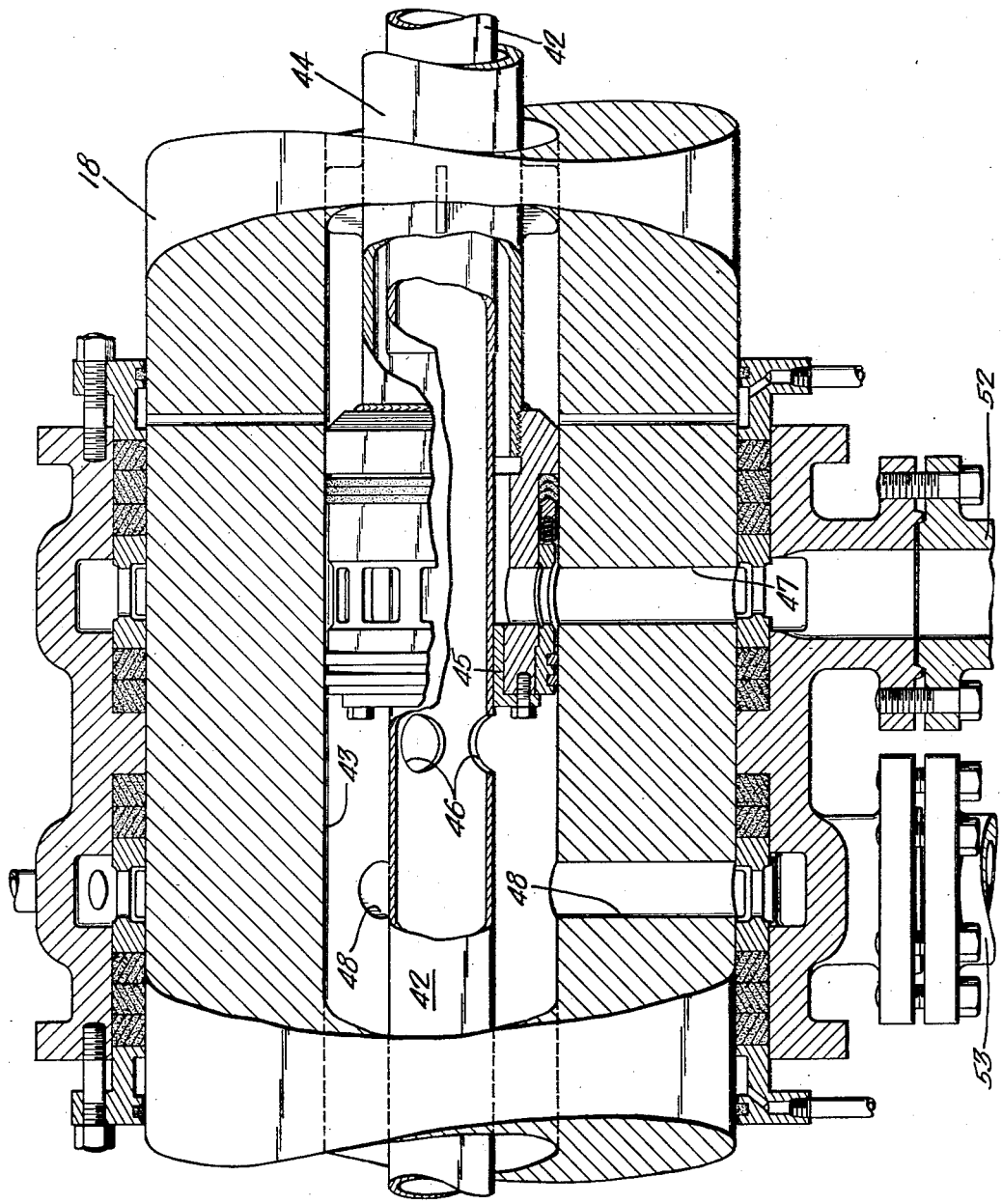

Oct. 17, 1944. P. C. PUTNAM 2,360,791
WIND TURBINE
Filed March 22, 1941 31 Sheets-Sheet 17

Inventor:-
Palmer Cosslett Putnam
by his Attorneys
Howson & Howson

Oct. 17, 1944. P. C. PUTNAM 2,360,791
WIND TURBINE
Filed March 22, 1941 31 Sheets-Sheet 18

Inventor:
Palmer Cosslett Putnam
by his Attorneys
Howson & Howson

Oct. 17, 1944.  P. C. PUTNAM  2,360,791
WIND TURBINE
Filed March 22, 1941   31 Sheets-Sheet 21

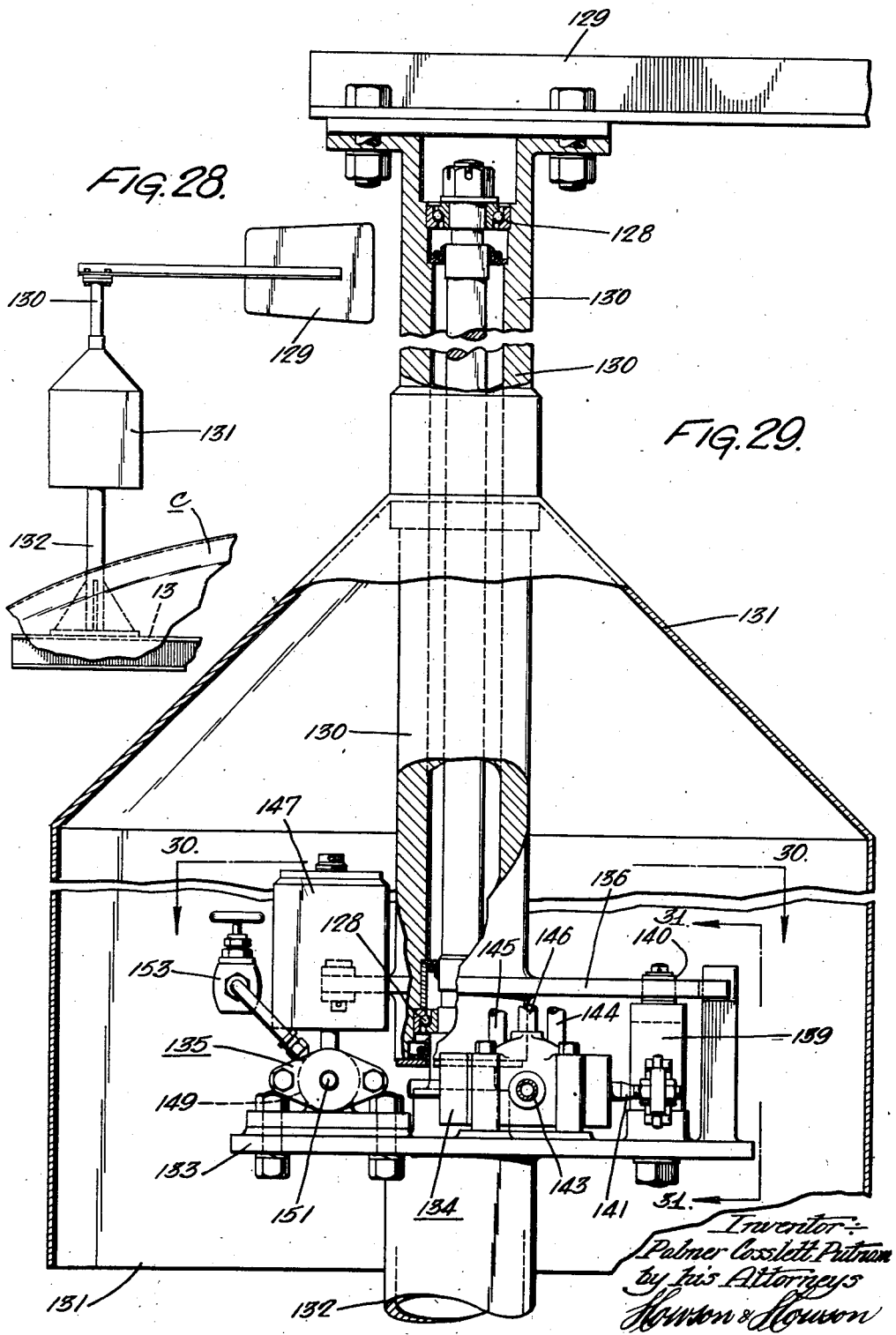

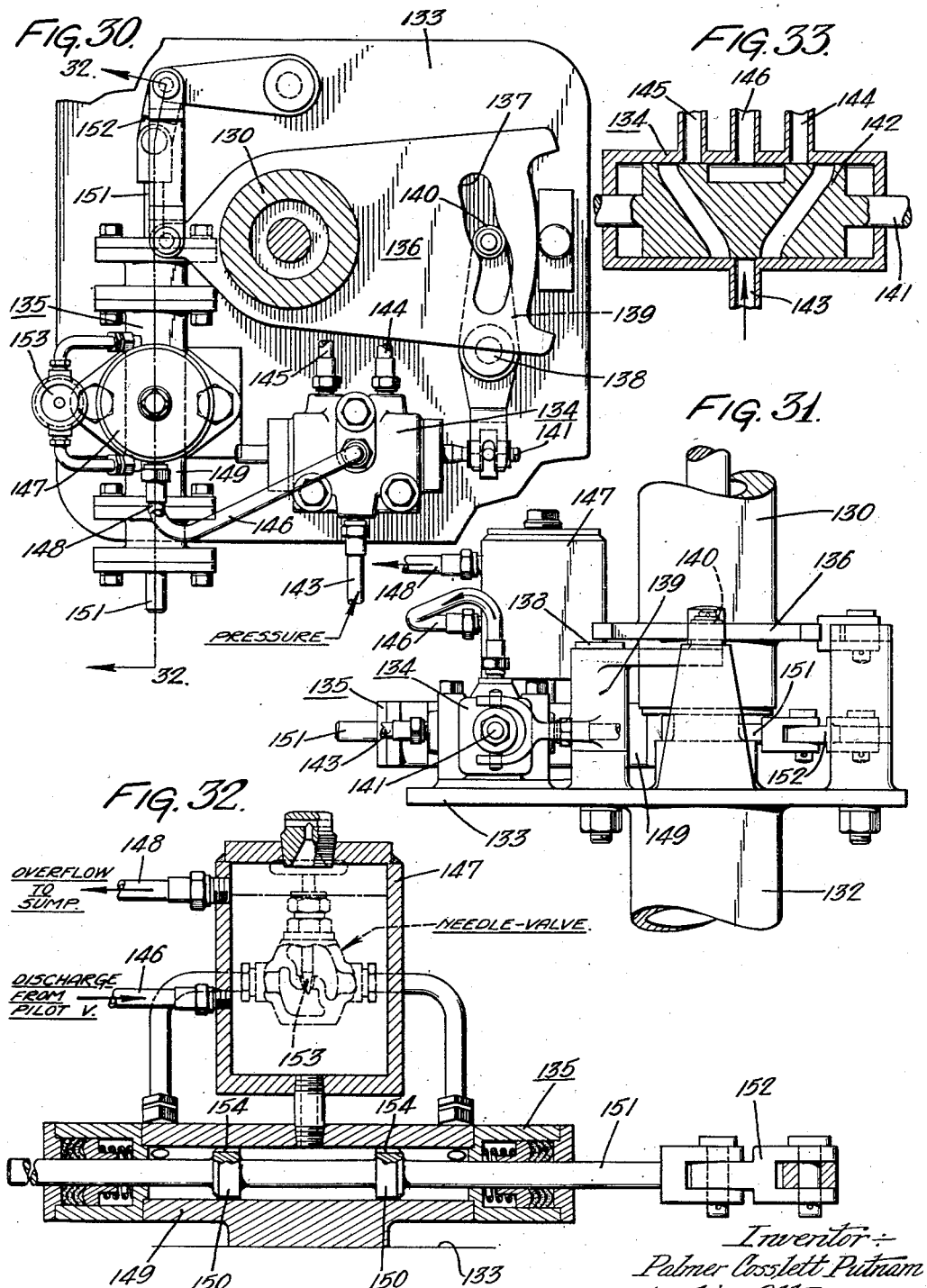

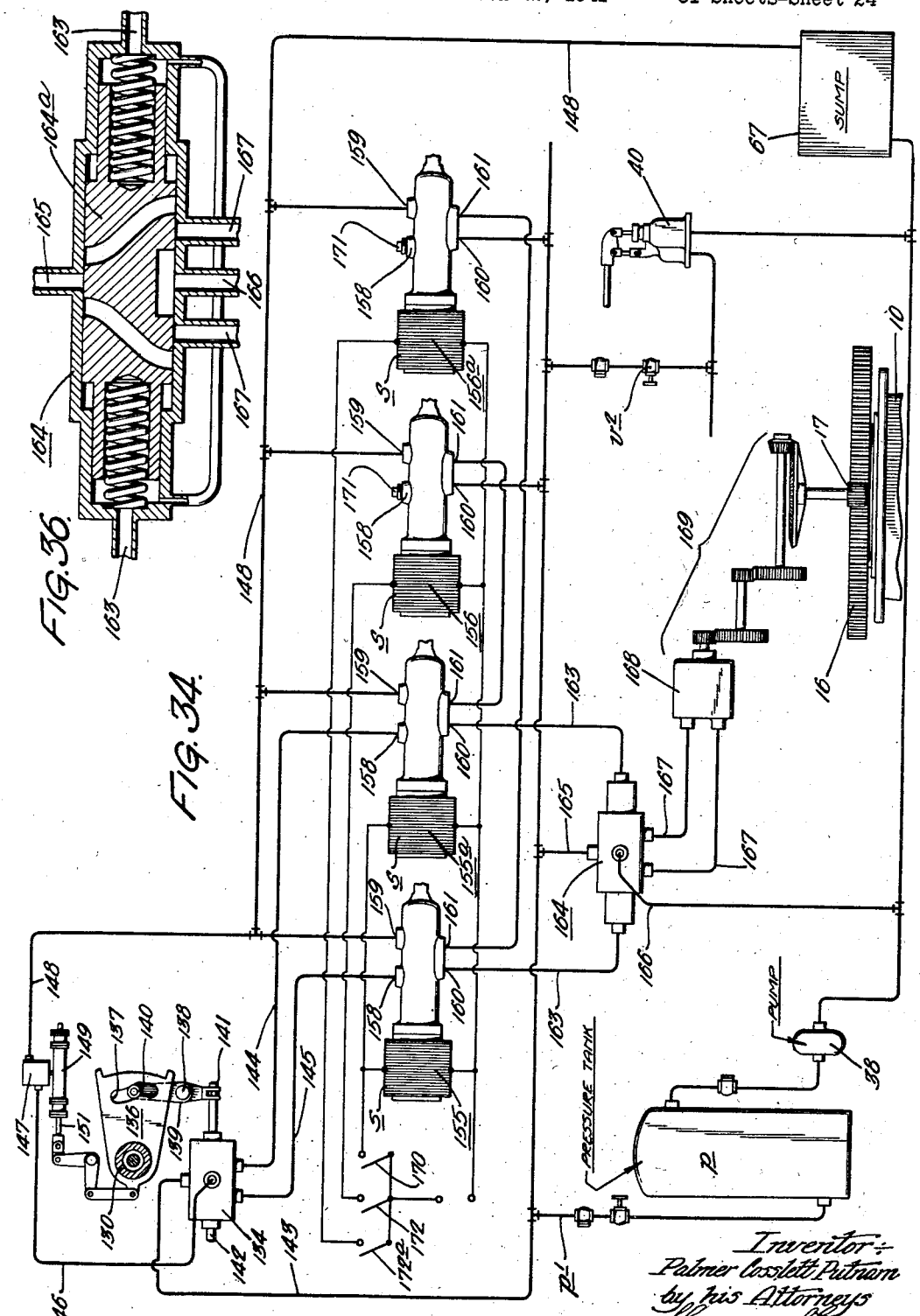

Oct. 17, 1944.   P. C. PUTNAM   2,360,791
WIND TURBINE
Filed March 22, 1941   31 Sheets-Sheet 25
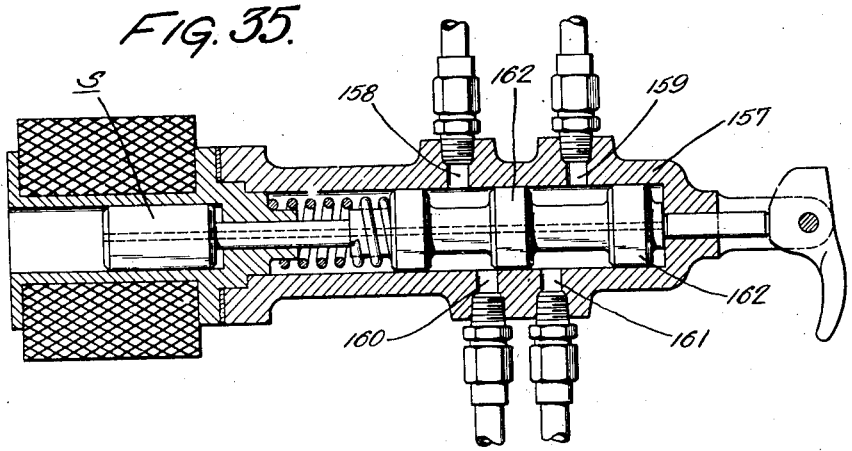
FIG. 35.
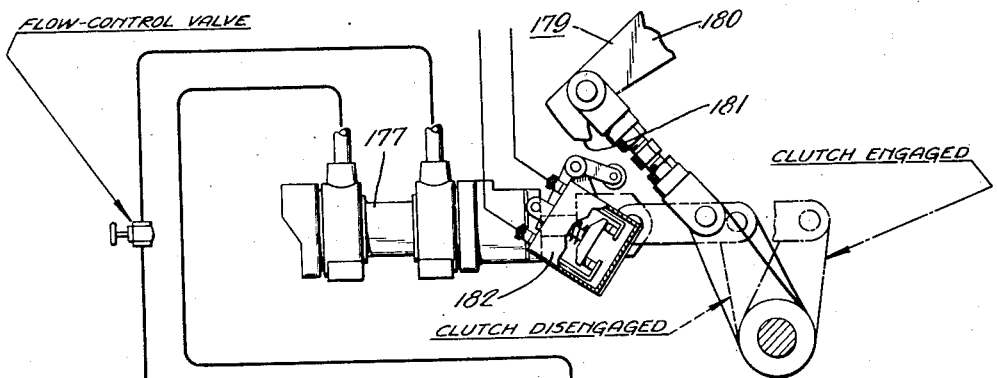
FIG. 37.
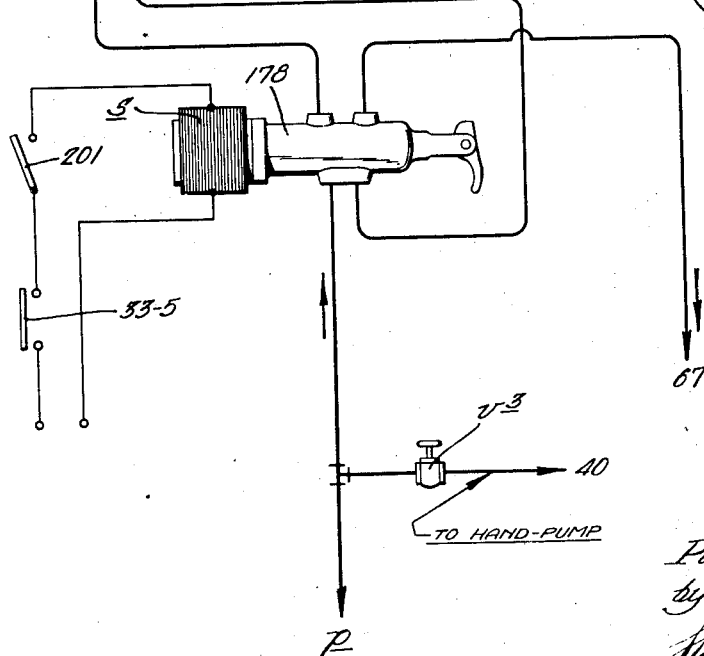
Inventor:
Palmer Cosslett Putnam
by his Attorneys
Howson & Howson

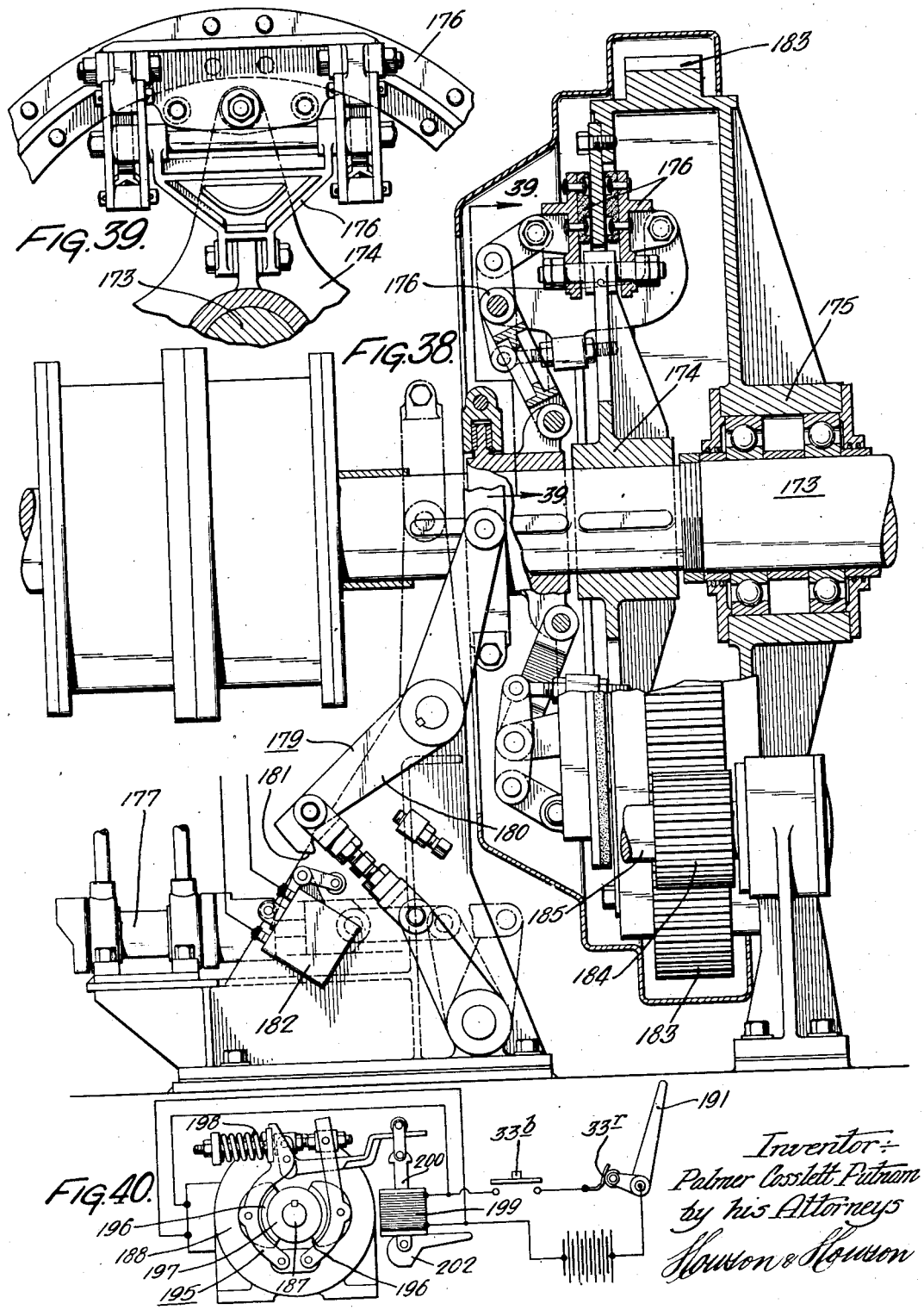

Oct. 17, 1944.    P. C. PUTNAM    2,360,791
WIND TURBINE
Filed March 22, 1941    31 Sheets-Sheet 27

Inventor:-
Palmer Cosslett Putnam
by his Attorneys
Howson & Howson

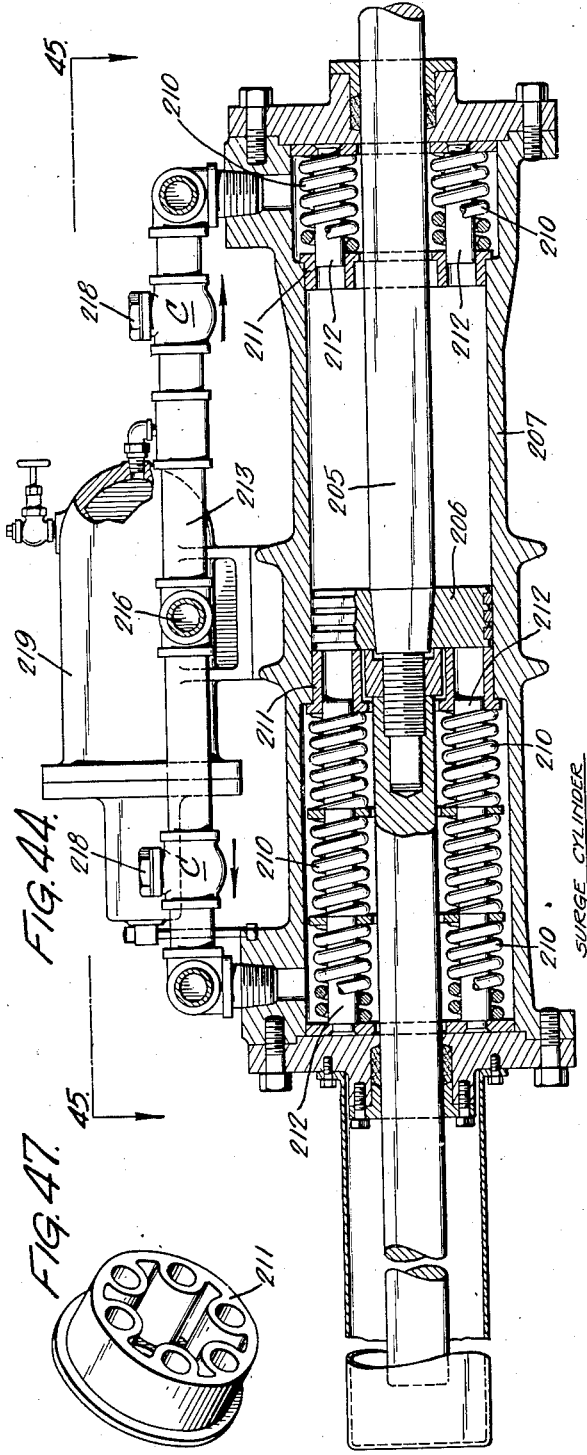
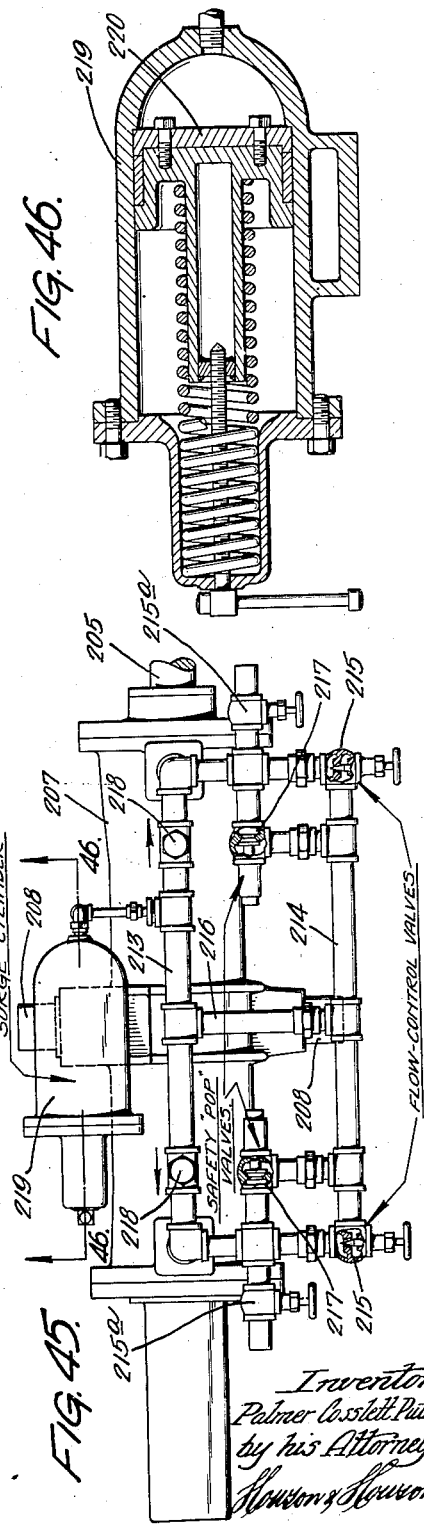

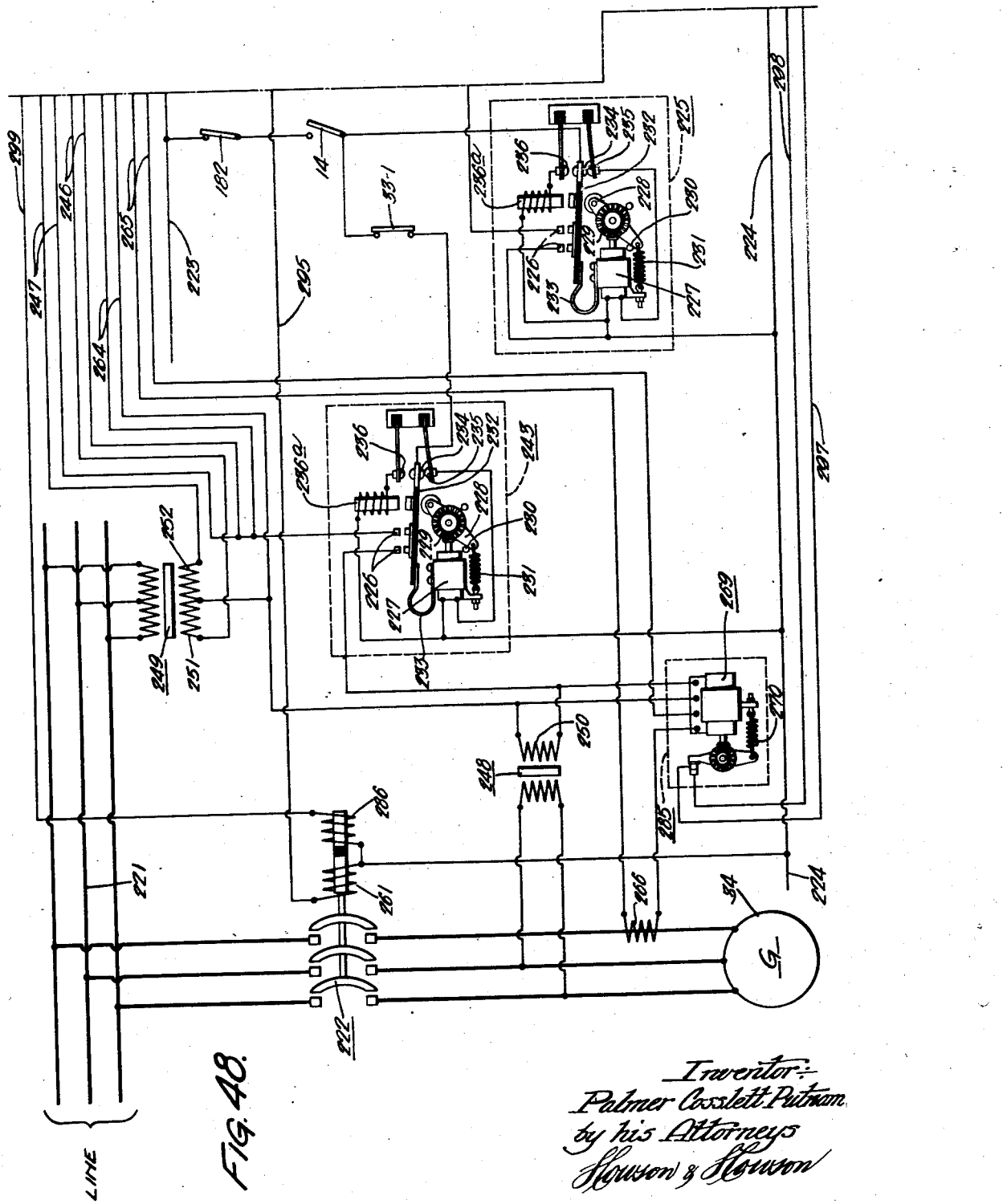

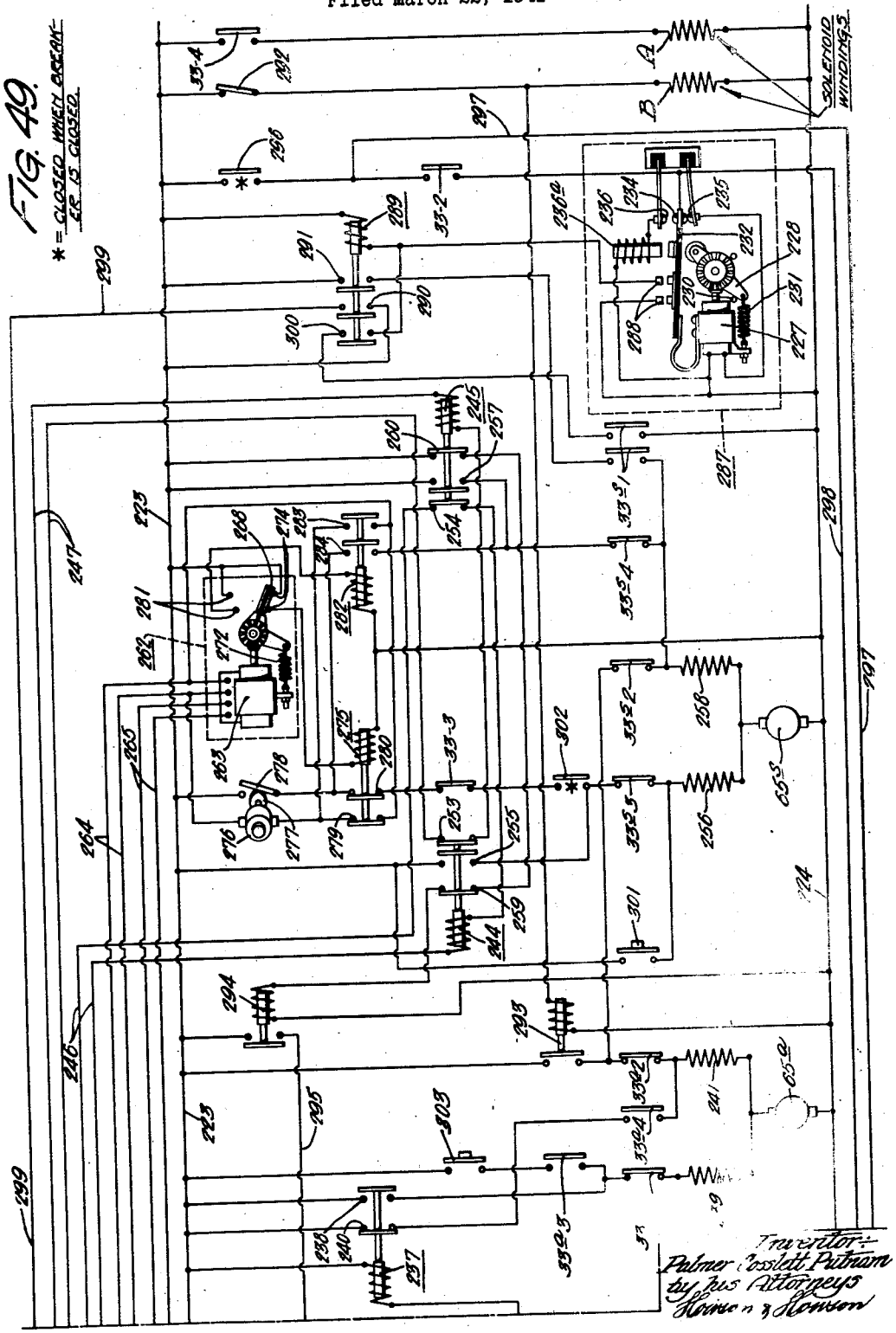

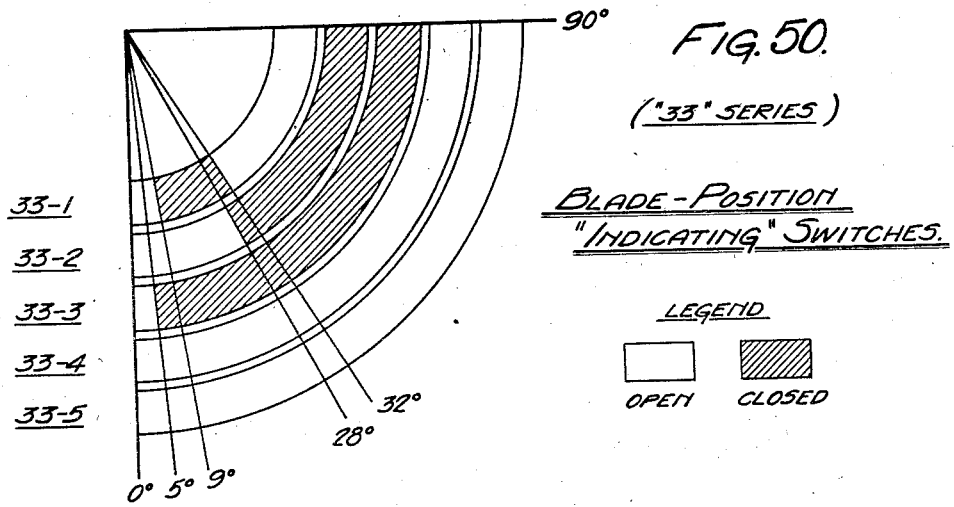
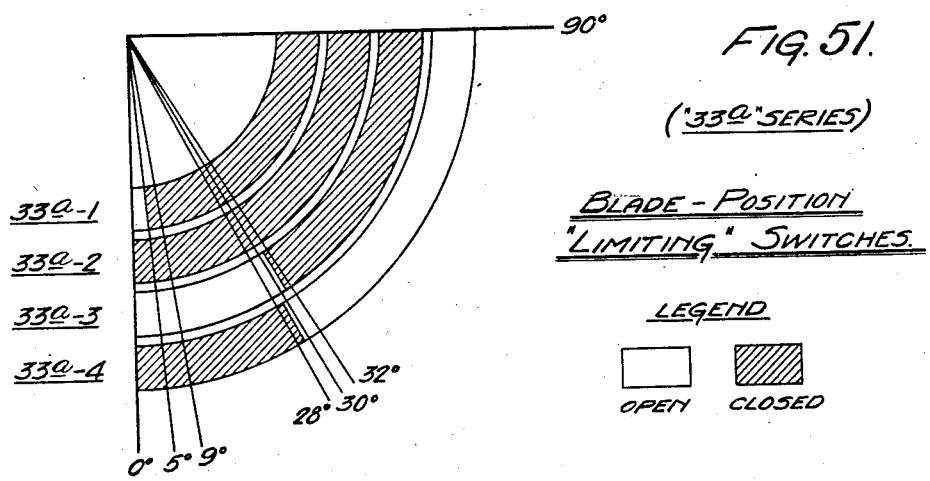
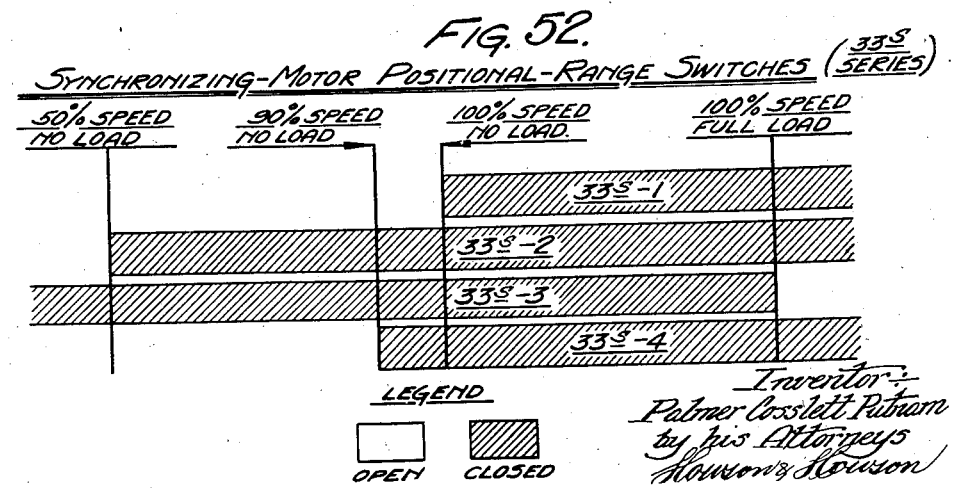

Patented Oct. 17, 1944

2,360,791

UNITED STATES PATENT OFFICE 2,360,791

WIND TURBINE

Palmer Cosslett Putnam, Brookline, Mass., assignor to S. Morgan Smith Company, York, Pa., a corporation of Pennsylvania Application March 22, 1941, Serial No. 384,752

28 Claims. (Cl. 170—59)

This invention relates to the conversion of the kinetic energy of the wind to electric energy by means of a propeller type wind turbine mounted on an elevated standard and an electric generator, in a predictable manner, and especially to the utilization of this principle for the operation of automatic aeroelectric generating stations adapted to float on a high-line or on a distribution circuit, or of isolated units of large output.

Electric generators driven by propeller type wind turbines have been used for many years for the generation of electric energy, but because no such power unit has heretofore solved the fundamental problems involved, aero-generation of electric energy has met with no general large-scale application, being confined to so-called "isolated" units, generating direct current and usually supported by storage batteries.

Broadly speaking, the difficulties lying in the path of economic conversion of the kinetic energy of the wind to electric energy may be said to present several problems. Wind, as a prime mover, leaves something to be desired, since alternate calms and gales do not constitute a source of constant power. Accordingly, some special storage facilities are ordinarily necessary, such as storage batteries or conversion of the available power to some form enabling its subsequent re-use in the production of power is necessary in order to carry peak demand over calm periods and to conserve peak generation over periods of low demand. This feature has been a necessary troublesome and inefficient feature of previous wind-driven electric power plants.

An important object of the present invention is the elimination of the storage problem and the provision of a wind turbine of large capacity capable of such regulation that it may directly feed a line in conjunction with other generating sources or, if so desired, may be operated as an isolated unit generating alternating current having a limited frequency deviation say of one or two cycles.

Another object of the invention is to provide an automatic aeroelectric generating station comprising a wind turbine-generator unit and automatic control means for synchronizing the generator to the line and controlling the unit when the wind velocity is within a predetermined range and for removing the generator from the line whenever the wind velocity departs from said range.

The energy in the wind varies as the cube of its velocity; for example, assuming constant density, the energy available at 30 M. P. H. is 27 times that at 10 M. P. H. It is, accordingly, essential that an aeroelectric generating station, in order to convert a substantial portion of the kinetic energy available to it, must be capable of operating efficiently through an extremely broad range of energy levels.

Wind power plants, if advantageously exposed, must experience wind velocities in excess of 100 M. P. H. several times during the normal life of a generating station. Gale protection, by turning the blades of a wind-turbine out of the wind, about the vertical axis, the horizontal axis, or the longitudinal axis, not only does not afford protection for either turbine or generator against the rapid changes in wind direction associated with high velocity turbulence, but it renders the generating station non-productive during a substantial number of hours per year. Accordingly, the invention has for a further purpose the provision of positive gale protection for the entire aeroelectric generating station, including turbine and generator, without shutdowns during gales, by permitting the blades to independently cone down-wind, responsive to wind forces and to centrifugal forces, by means of articulating couplings between the blade roots and the hub.

In efficiently converting wind energy to electric energy without injury to the generating station, consideration must, likewise, be given to gusts. Wind gusts are of two types; the first, observed near the ground where wind velocities habitually fluctuate momentarily between wide limits, delivers force in the form of short gusts of relatively high velocity separated by periods of relative calm. This type of turbulence, which is composed of frictional gusts, is induced by the terrain over which the air has passed, the intensity of the turbulence being partially defined by the roughness of the terrain. This type of turbulence diminishes with altitude and follows certain more or less empirical laws related to the roughness of the terrain. With a favorable terrain, an elevated standard, for example one 200 feet in height, will secure for a wind turbine mounted thereon an air flow markedly freer from frictional gusts than is experienced at say 50 feet above the same terrain.

The second type of turbulence is composed of convective gusts resulting from convective disturbance under a cloud and the period and diameter appear to be related to the cloud density, height, dimensions and velocity, while the amplitude is related to the mean wind velocity and to the temperature gradient. In general, gusts of this type have a higher amplitude factor than those of the frictional type.

Since the energy of the wind varies as the cube of its velocity, it will be understood that the average power developed by a variable wind, even above the zone of abundant frictional gusts, is derived largely from intermittent gusts. Unless the power of these gusts can be substantially utilized, a very considerable part of the available energy is lost. It may be that momentary energy in a gust exceeds the mechanical capacity of the generator.

A further object of the invention is the provision of a wind turbine whose unit inertia is such that there is inherent protection against line disturbances arising from the fluctuating energy gusts.

A further problem is that of the velocity gradient. Above a site, up to a height of several hundred feet, the wind velocity tends to increase as a function of the height above the ground. The result is that the unit energy available in the upper portion of the disc area tends to be greater than the unit energy in the lower portion, with the result that, in the case of a turbine having independently conable blades and an axis of rotation which is horizontal, the coning angle in the upper portion of the disc area would tend to be greater than that in the lower portion. Since the utilization factor of a turbine of this type is related not only to the projected area of the turbine in the way of the wind but also to the coning angle, it follows that the efficiency in the upper portion of the disc area would tend to fall below that in the lower portion.

A still further problem is related to sites which are ridges. Up to a certain height above a ridge the airflow is not horizontal but contains a vertical component caused by the deflection of the ridge. In a turbine whose axis of rotation is horizontal and which is not free to cone, the disc area would be at an angle of yaw to the prevailing wind direction, with resultant lowered utilization.

The inclination of the axis of rotation of my turbine downward and forward with the direction of the wind, in combination with independent coning of the blades thereof serves to oppose the higher wind pressure in the upper portion of the disc area with a gravity component of the dead weight of the blade and to provide a mean plane of rotation whose angle is more nearly normal to the vertically inclined wind direction, thus enhancing the efficiency of operation.

A still further object of the invention is the prevention of disruptive racing of the wind turbine in event of failure of the load or of the controlling system during a wind of high pressure through provision of a construction inherently limiting the speed of rotation of the turbine.

Another object of the invention is the provision of means for "spilling" the excess power of wind of high velocity when the maximum power input of the generator has been reached.

A still further object of the invention is the establishment of optimum ratios for the construction of a turbine of this character having a proper unit inertia for inherent protection through the inclusion in the turbine of an adequate fly-wheel effect.

Other objects of the invention are the provision of controls whereby the above objects may be accomplished, and the installation otherwise rendered efficient and guarded against injury or improper operation.

These and other objects I attain by the construction shown in the accompanying drawings, wherein:

Fig. 9 is a section on line 9—9 of Fig. 7;

Fig. 10 is an enlarged sectional view on line 10—10 of Fig. 7;

Fig. 13 is a section on line 13—13 of Fig. 10;

Fig. 16 is a vertical sectional view taken on line 16—16 of Fig. 5 and showing the distribution connections between the governor and the pitching motor;

Fig. 17 is a plan view of the governor and the associated connections with the turbine shaft;

Fig. 18 is a section on line 18—18 of Fig. 16;

Fig. 19 is a section on line 19—19 of Fig. 16;

Figure 1:
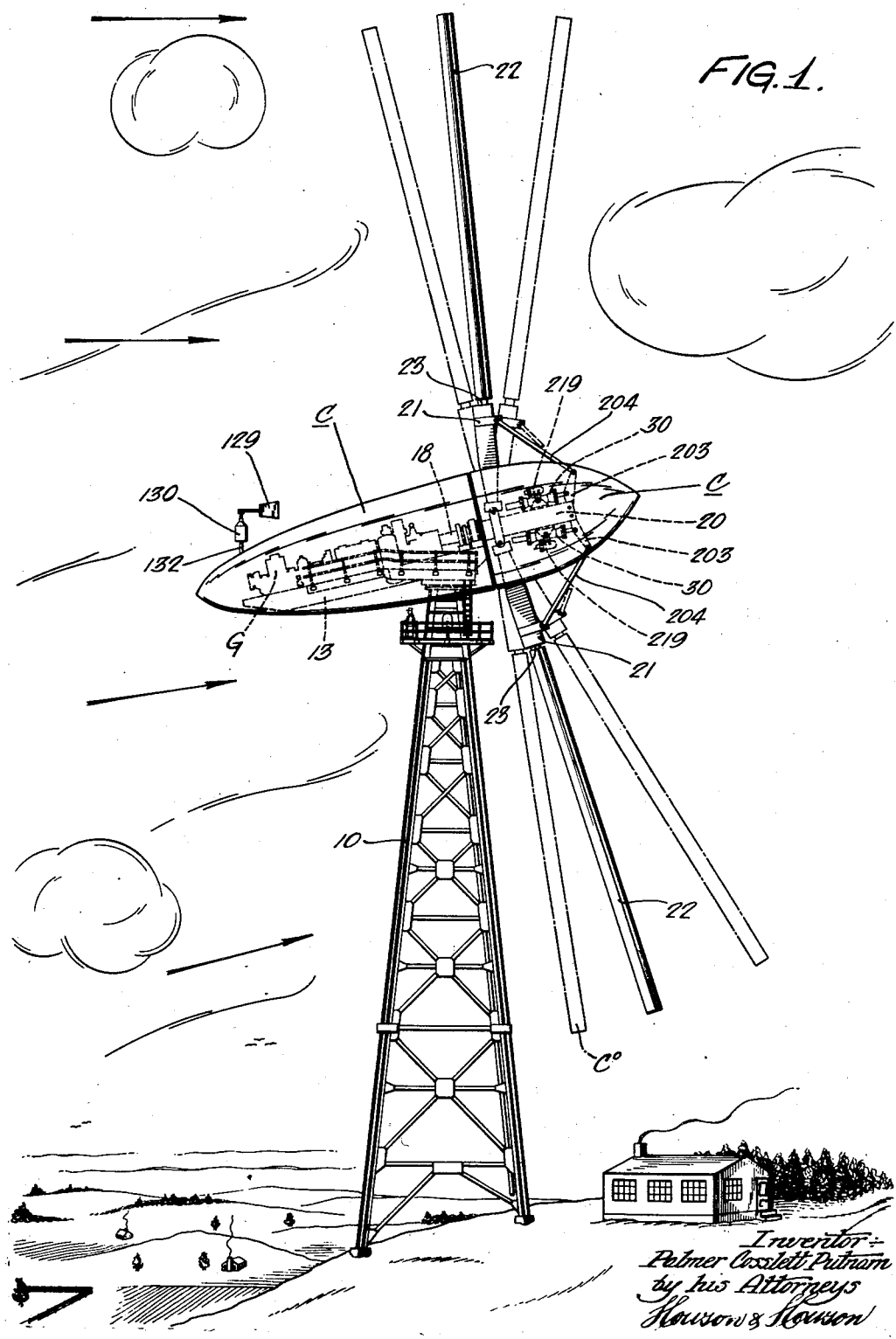
Fig. 1 is a side elevation of a wind turbine constructed in accordance with my invention.
Figure 2:
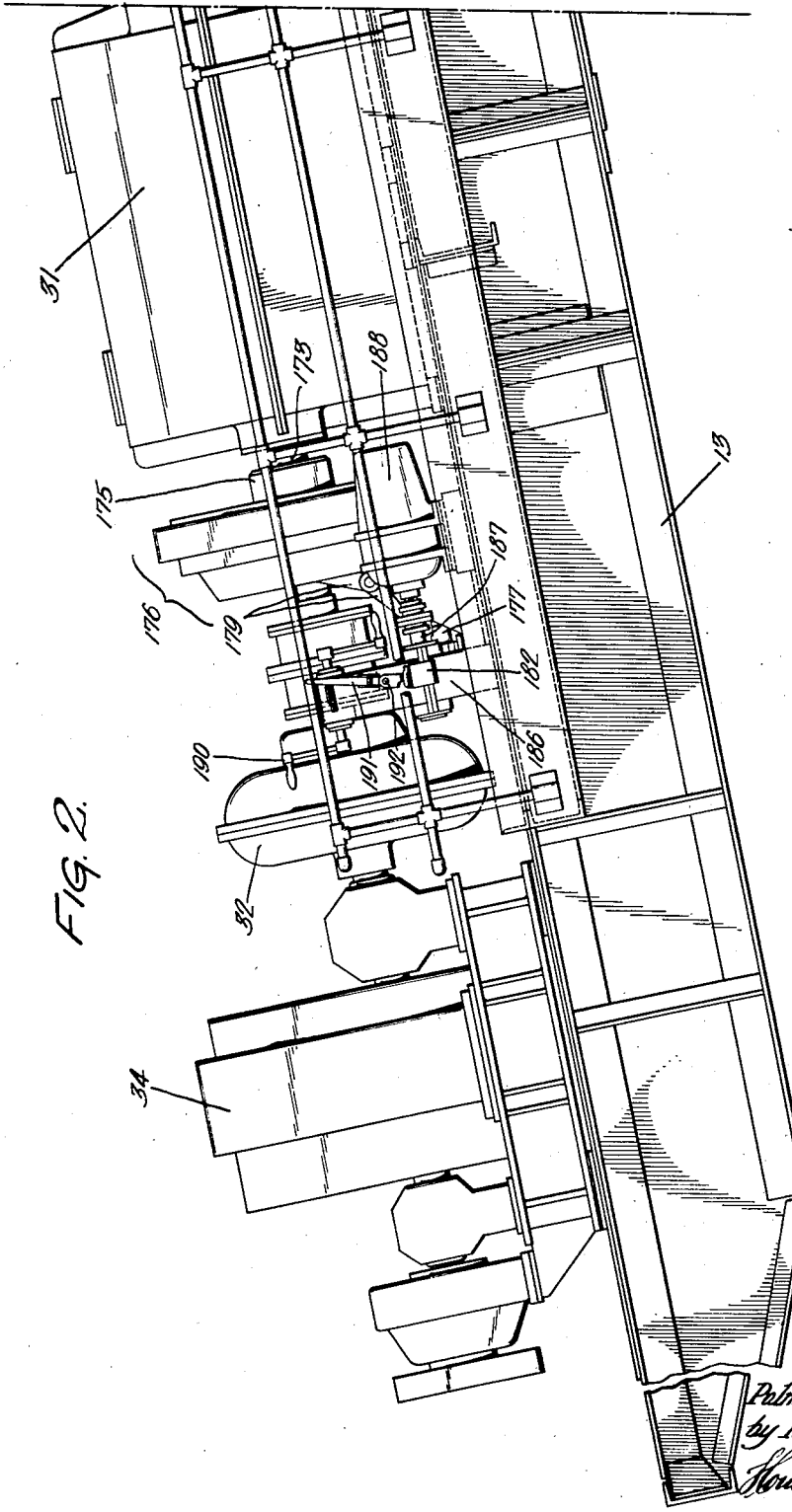
Fig. 2 is a side elevation of the forward portion of the platform mechanism.
Figure 3:
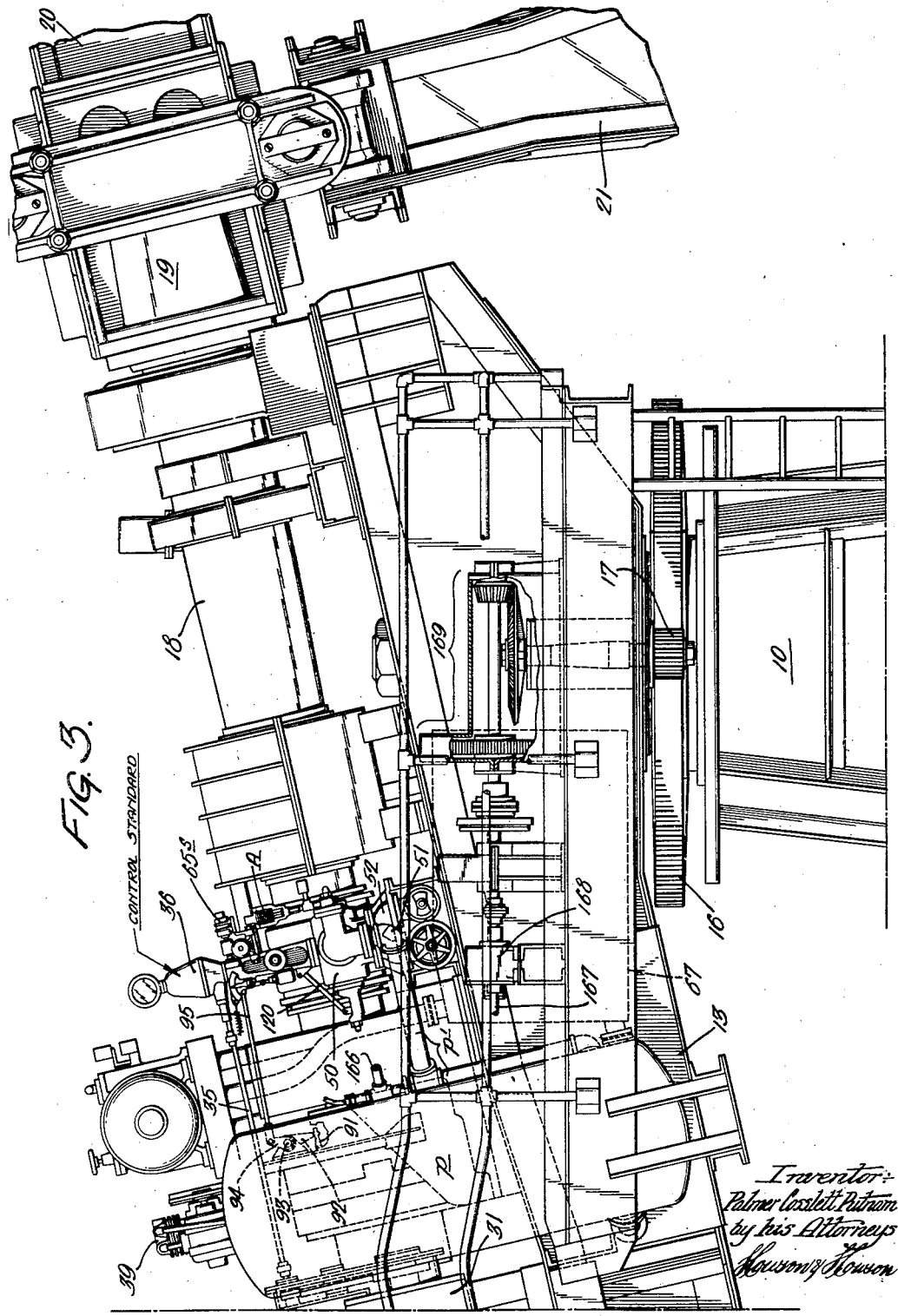
Fig. 3 is a side elevation of the rear portion of the platform mechanism.
Figure 4:
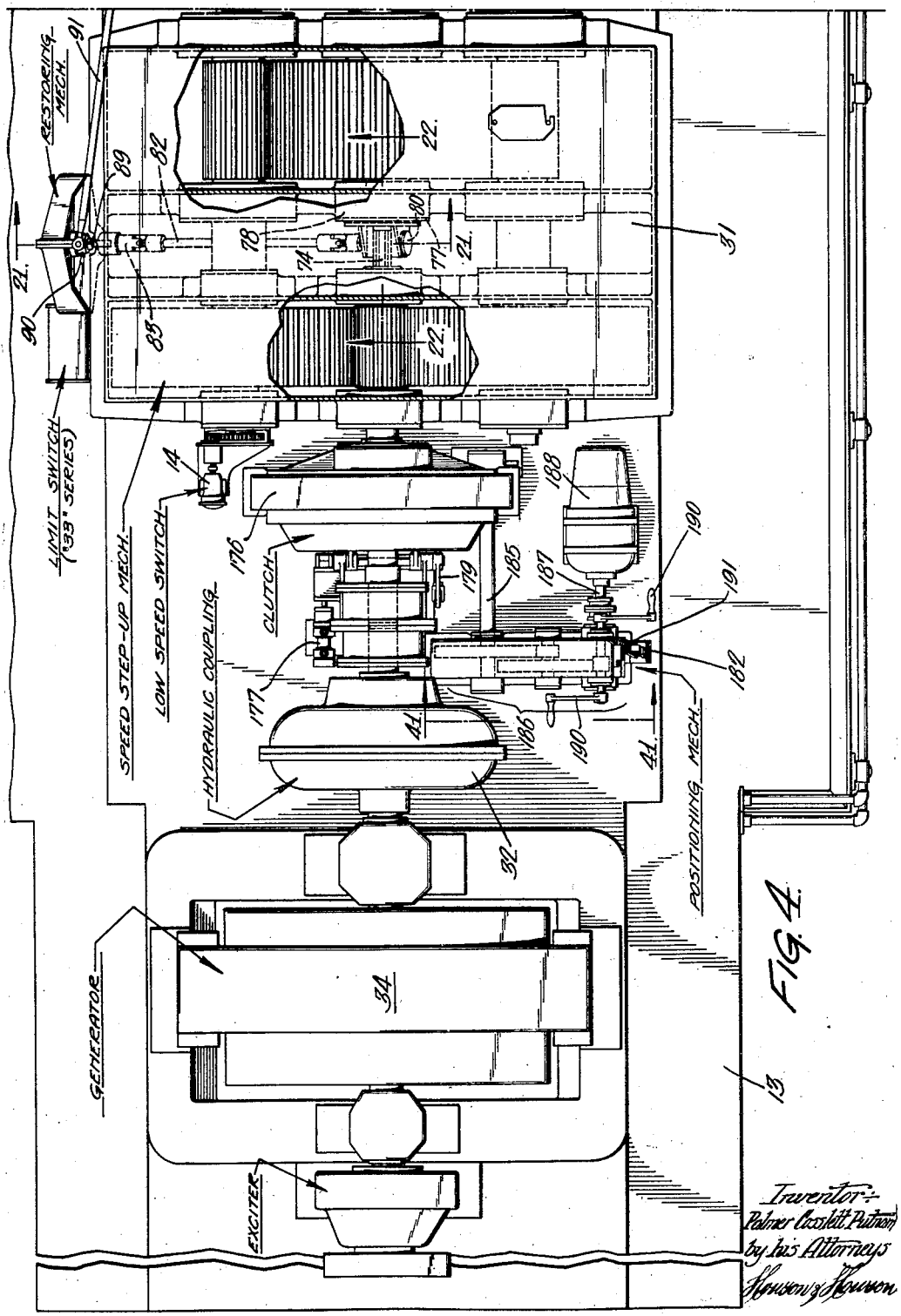
Fig. 4 is a plan view partially broken away of the forward portion of the platform mechanism.
Figure 5:
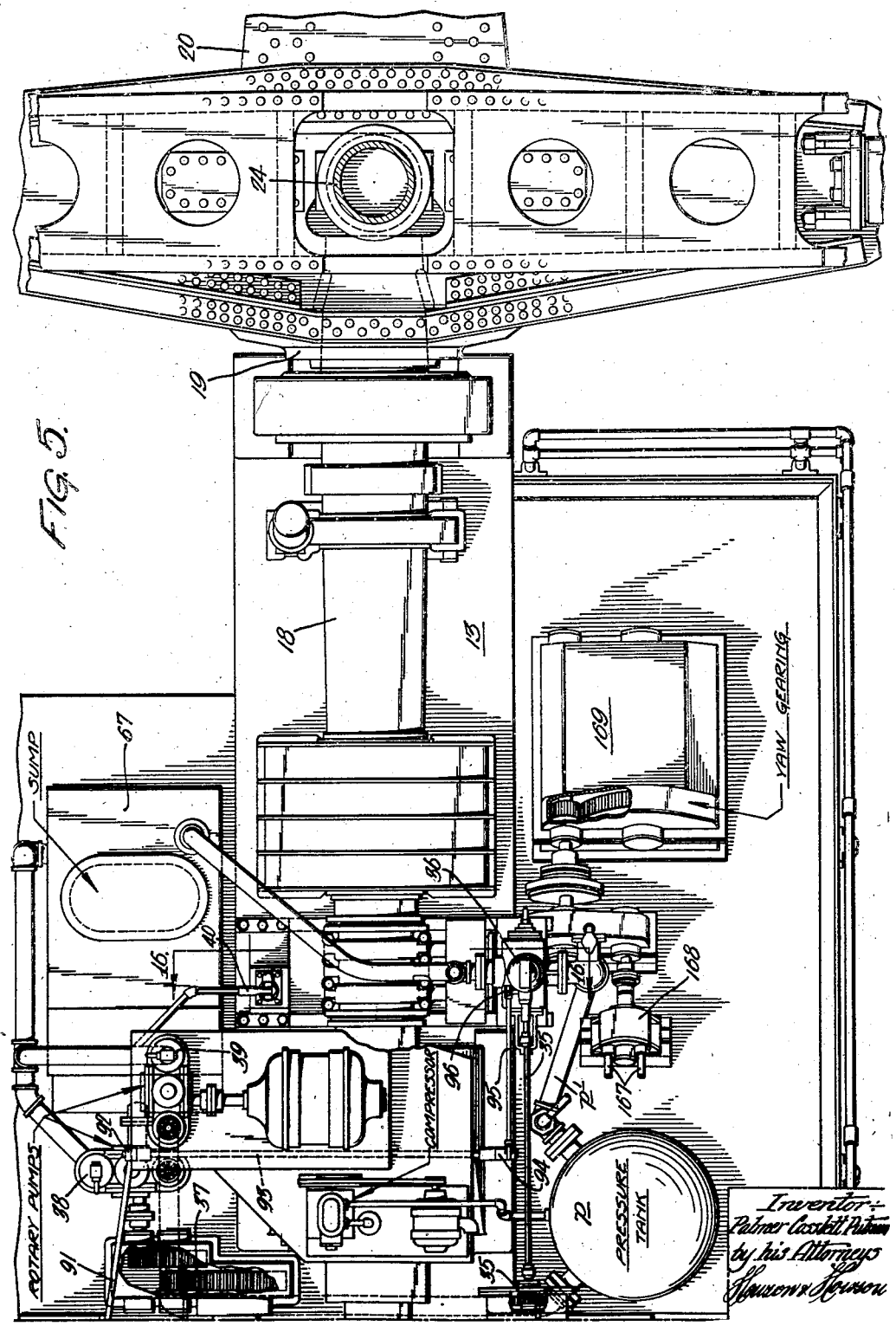
Fig. 5 is a plan view of the rear portion of the platform mechanism.
Figure 6:
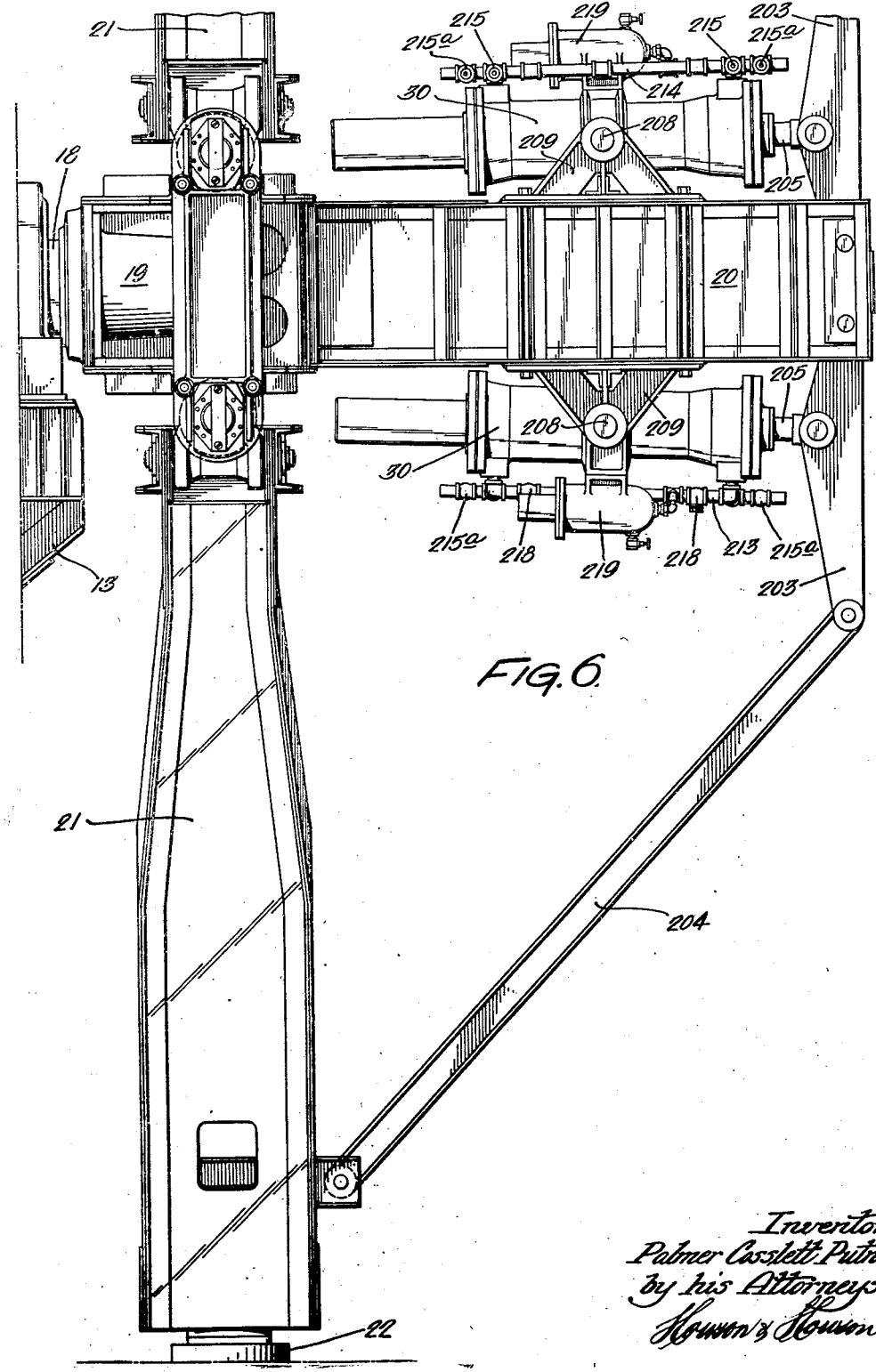
Fig. 6 is an enlarged fragmentary side elevation of the tail-piece illustrating the blade attachment thereto.
Figure 7:
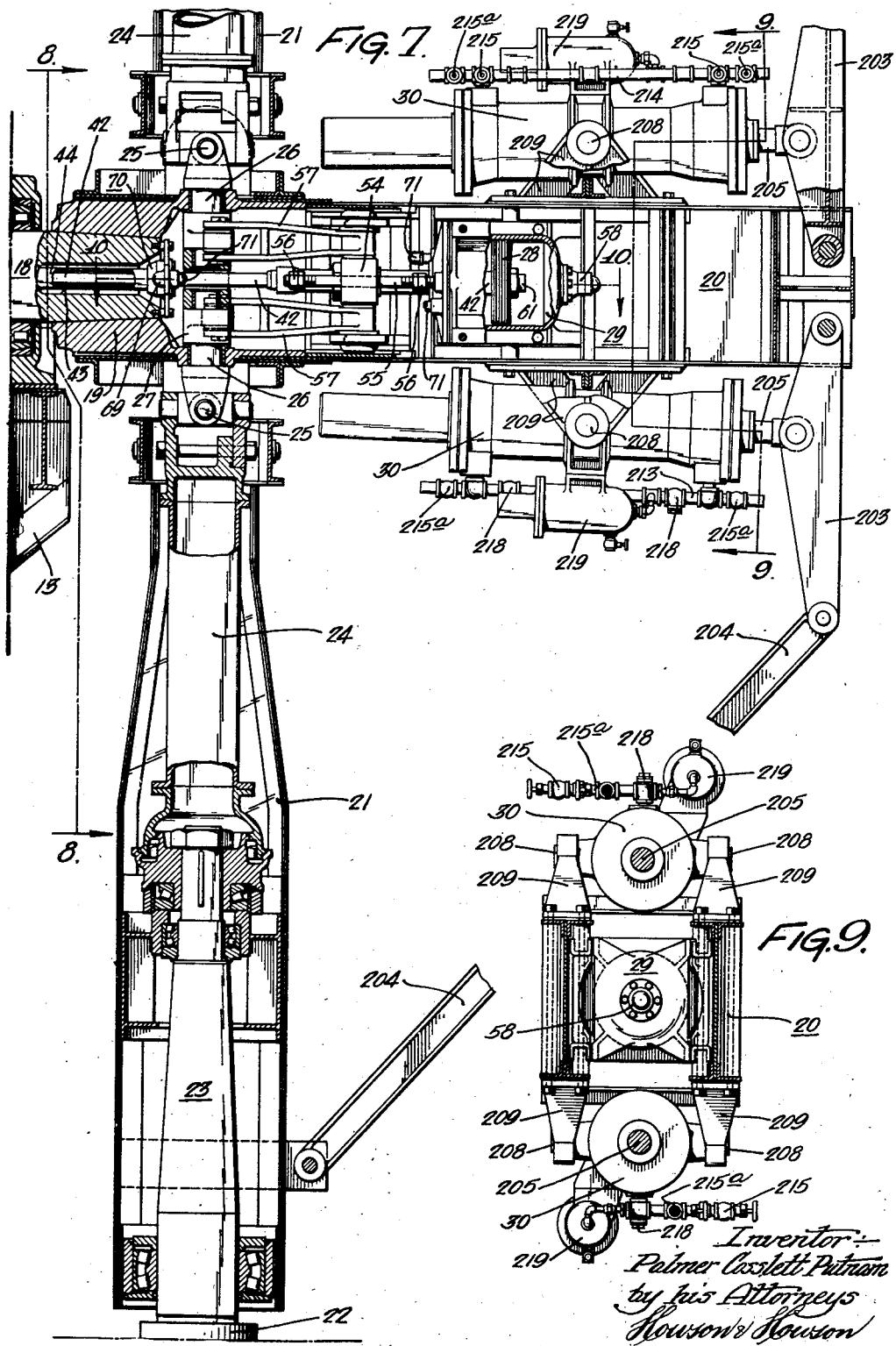
Fig. 7 is a vertical sectional view through the tail-piece.
Figure 8:
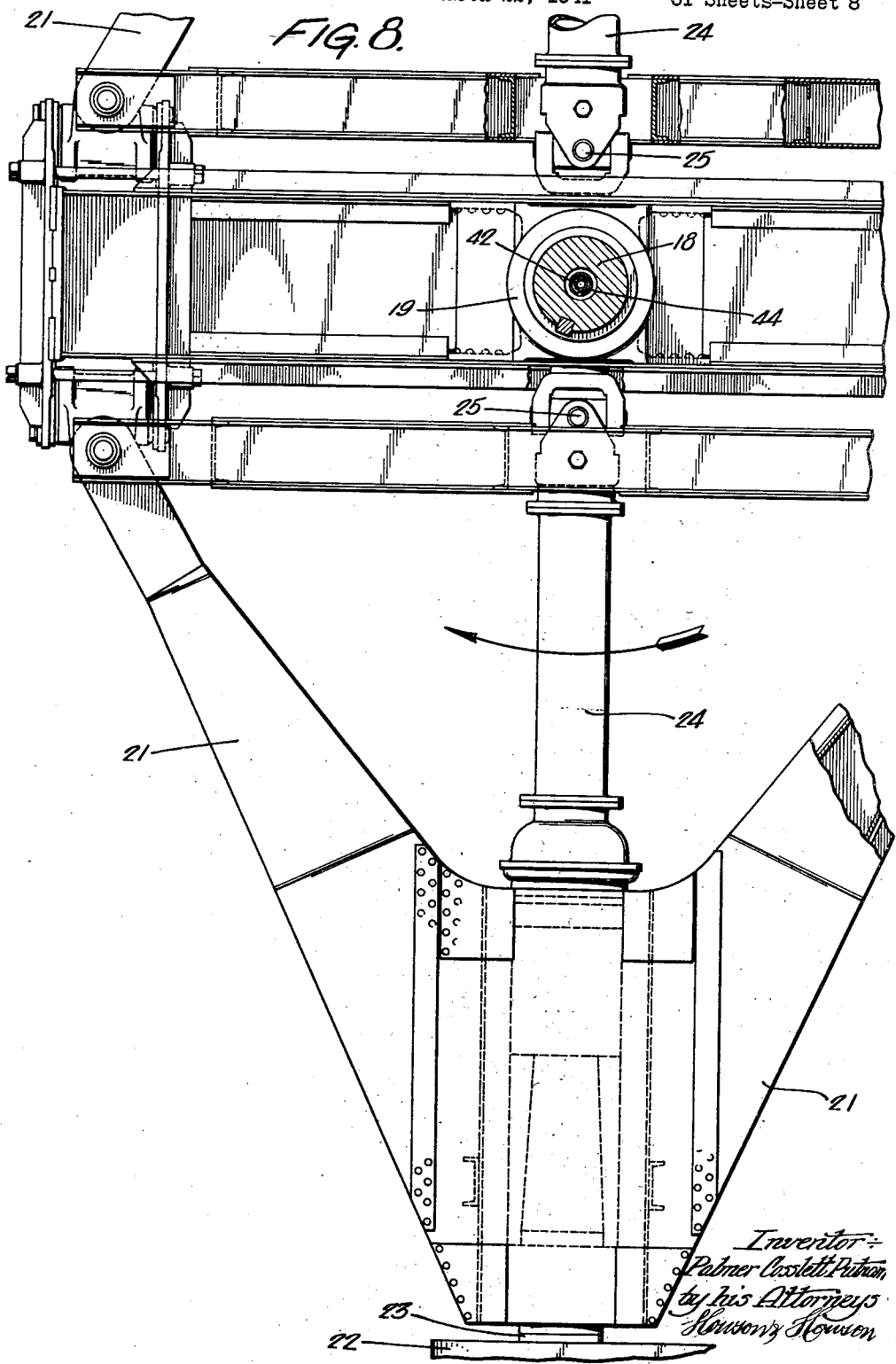
Fig. 8 is a fragmentary section on line 8—8 of Fig. 7.
Figure 11:
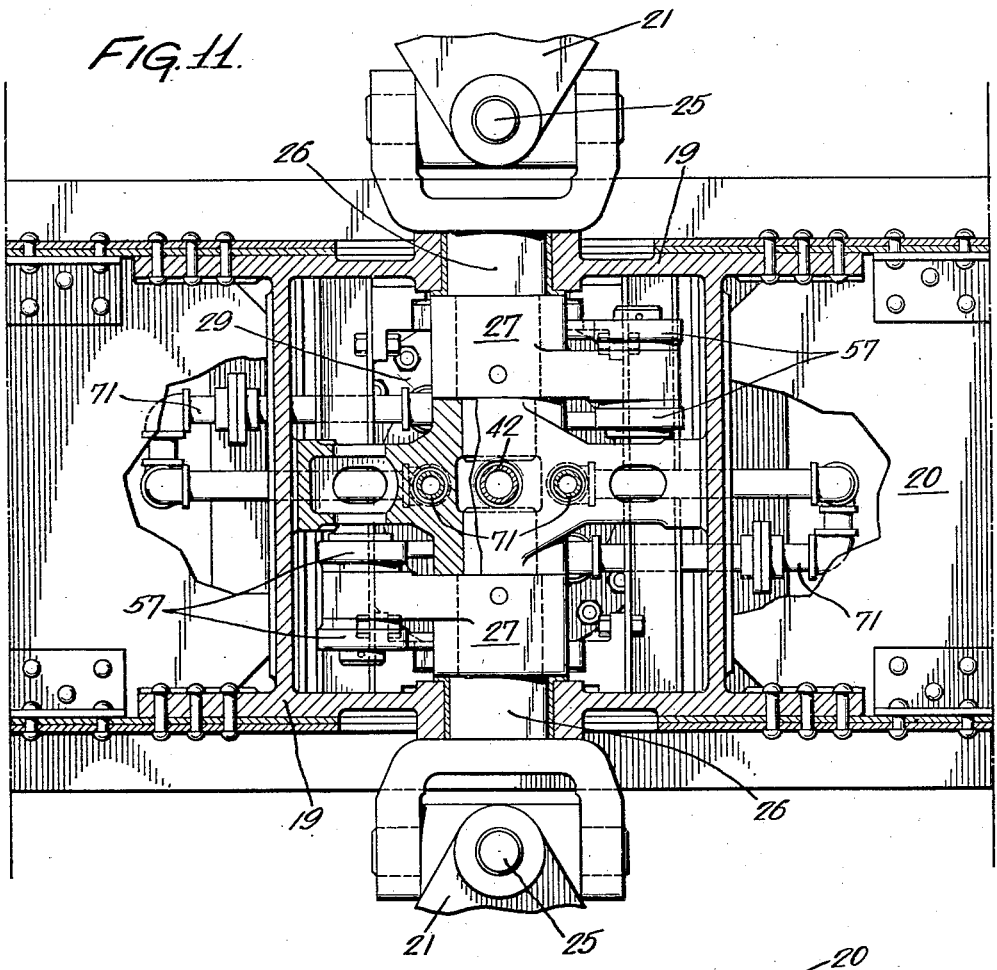
Fig. 11 is a section on line 11—11 of Fig. 10.
Figure 25:
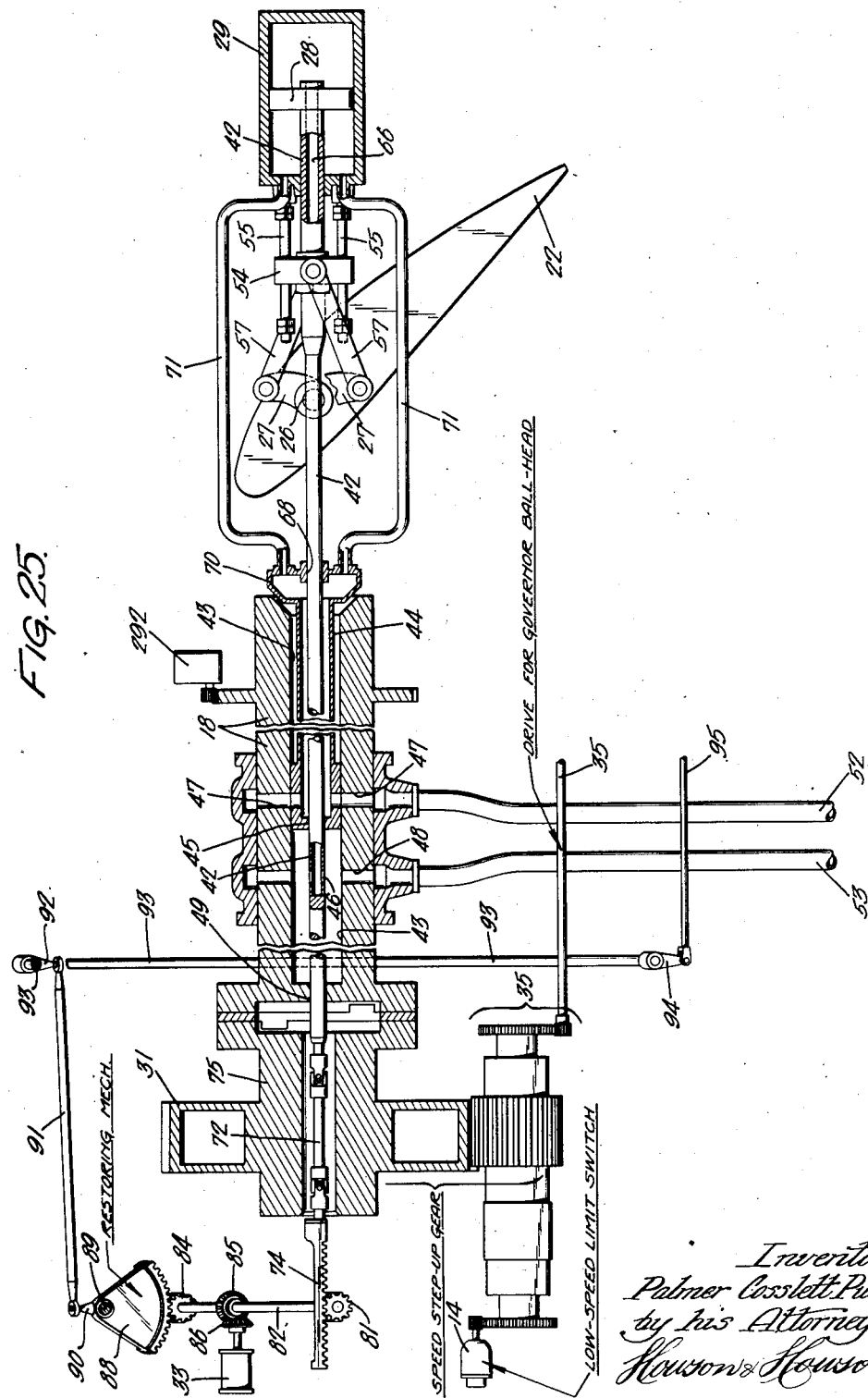
Figure 26:
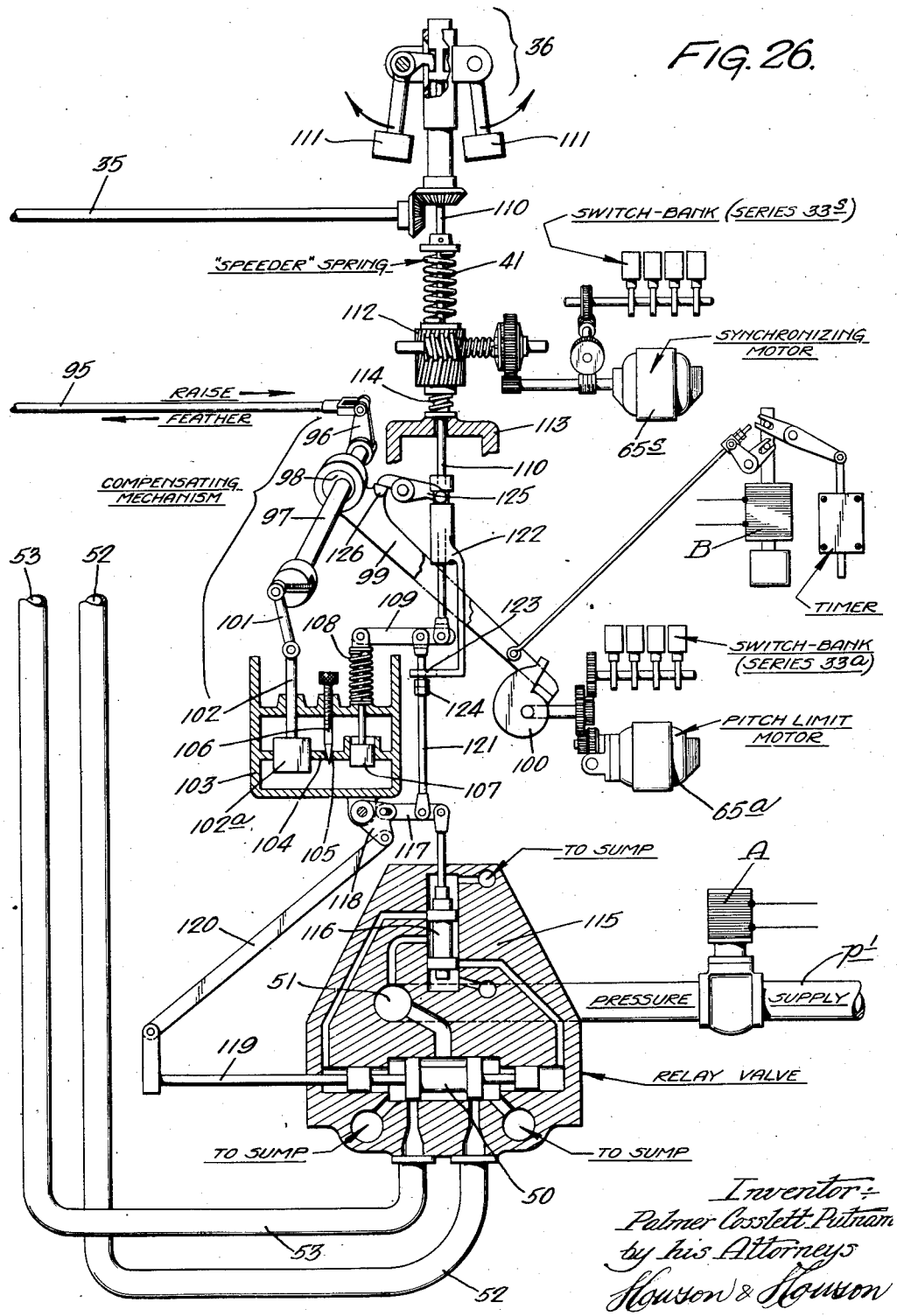
Figure 27:
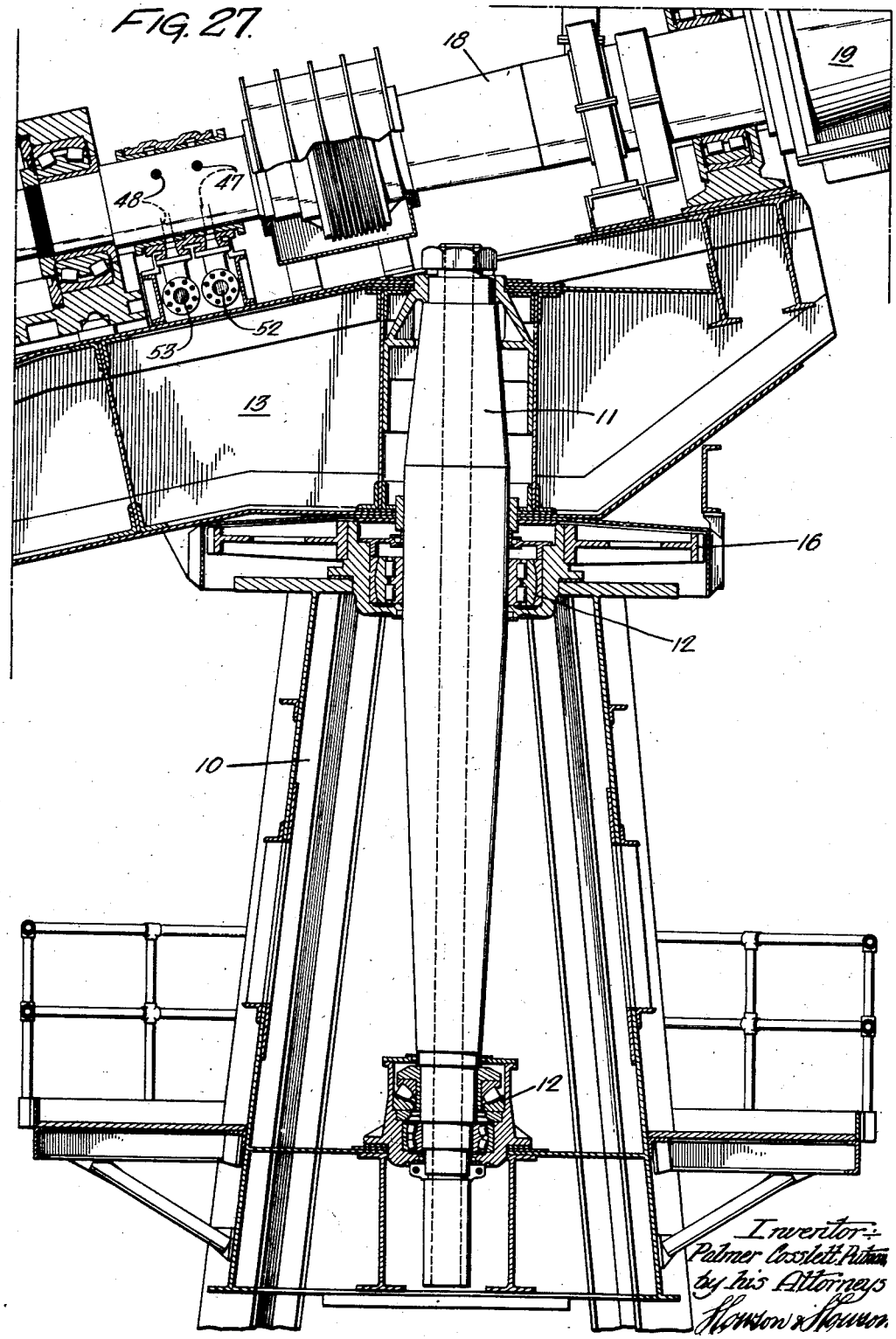
Figure 41:
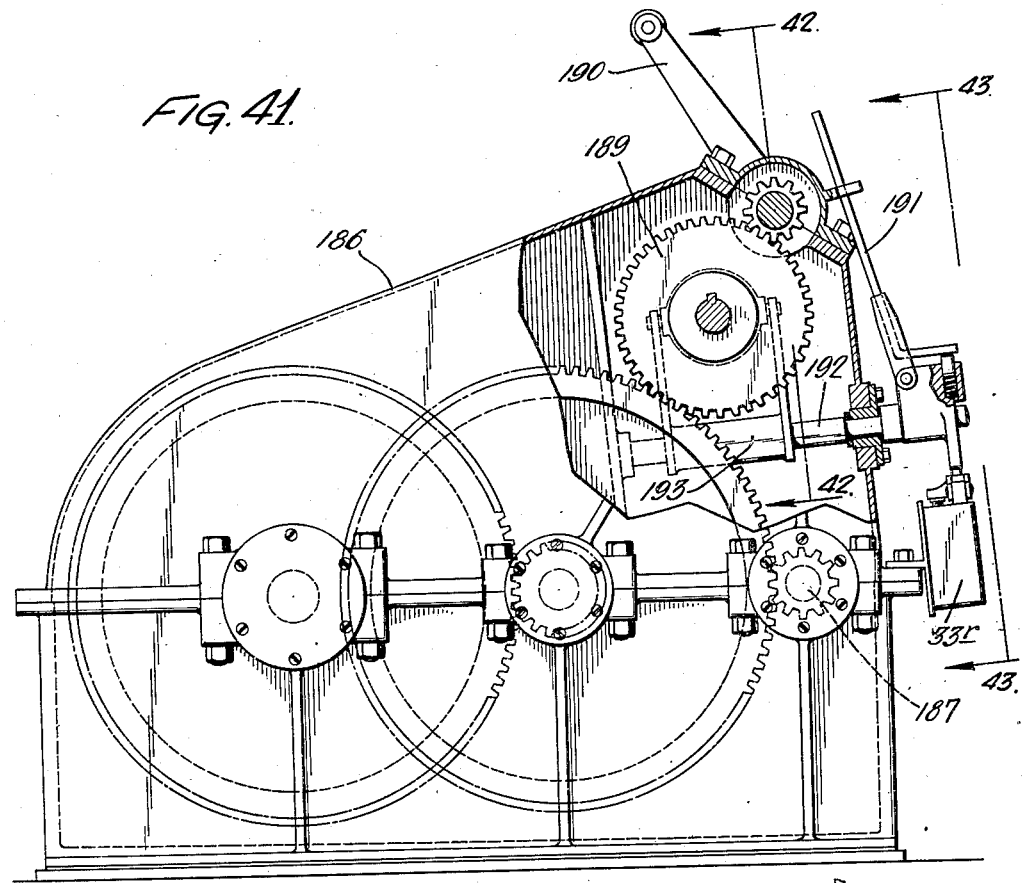
Figure 42:
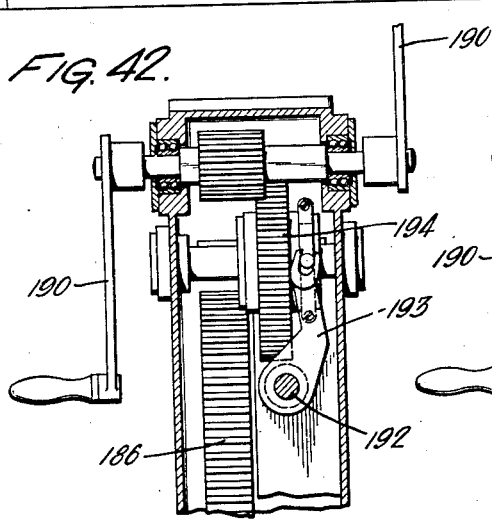
Figure 43:
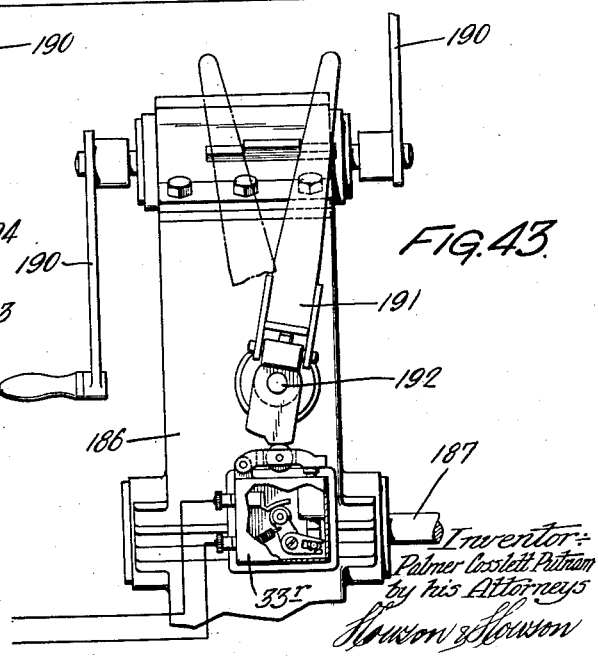

Figs. 25 and 26 comprise a composite diagrammatic view of the pitch control mechanism;

Fig. 27 is a vertical sectional view through the rear portion of the plateform mechanism showing the rotational support for the platform and associated mechanism;

Fig. 28 is a side elevation showing the control standard for the yaw control mechanism;

Fig. 29 is an enlarged view partially in vertical section of the yaw control standard;

Fig. 30 is a section on line 30—30 of Fig. 29;

Fig. 31 is a rear elevation of the vane-controlled yaw mechanism as viewed from line 31—31 of Fig. 29;

Fig. 32 is a section on line 32—32 of Fig. 30;

Fig. 33 is a diagrammatic section through the vane control pilot valve;

Fig. 34 is a diagrammatic showing of the automatic and manual controls for yawing;

Fig. 35 is a typical sectional view through a yaw control valve;

Fig. 36 is a diagrammatic section through the relay valve of the yaw control mechanism;

Fig. 37 is a diagrammatic illustration of the control mechanism for the clutch of the shaft-rotating mechanism;

Fig. 38 is a vertical sectional view through the clutch of the shaft-rotating mechanism;

Fig. 39 is a section on line 39—39 of Fig. 38;

Fig. 40 is a diagrammatic illustration of the brake mechanism associated with the shaft-rotating mechanism;

Fig. 41 is a section on line 41—41 of Fig. 4;

Fig. 42 is a section on line 42—42 of Fig. 41;

Fig. 43 is a section on line 43—43 of Fig. 41;

Fig. 44 is a vertical sectional view through one of the coning cylinders;

Fig. 45 is a plan of the coning mechanism as viewed from line 45—45 of Fig. 44;

Fig. 46 is a section on line 46—46 of Fig. 45;

Fig. 47 is a perspective view of one of the spring seats of the coning cylinder;

Figs. 48 and 49 comprise a composite wiring diagram of the electrical control system of the unit;

Fig. 50 is a diagrammatic view illustrating the operating cycles of the position-indicating switches;

Fig. 51 is a similar diagram illustrating the operative cycle of the blade position limiting switches; and Fig. 52 is a diagram illustrating the operative cycle of the synchronizing switches.

Referring now to the drawings, and more particularly to Figures 1 to 5 and 27 thereof, the numeral 10 generally designates a tower of suitable construction upon the upper end of which, through a pintle shaft 11 mounted in suitable bearings 12—12, a platform 13 is mounted for rotation, the upper end of the tower being at present shown as bearing a stationary gear 16 engaged by a pinion 17 which may be rotated either automatically or under manual control, as hereinafter more fully described, to yaw the platform 13.

Mounted upon the rear end of the platform 13 is a turbine shaft 18 to the rear end of which, through a casting 19, a tail housing 20 is affixed. The shaft 18 is axially inclined, having its forward or up-wind end depressed, for a purpose presently to apper, and, preferably, for the purpose of convenience in fabrication, the platform 13 is similarly inclined. The tail casting 19, through a pair of A-frames 21 pivoted thereto supports turbine blades 22 for oscillation in a rotating plane including the axis of shaft 18. That is to say, the blades may oscillate in planes including the axis shaft of 18. The supporting shaft 23 of each blade is rotatably mounted in the head of the A-frame, and is connected through a torque tube 24 and universal joint 25 with a stub shaft 26 rotatably mounted in the tail-piece and bearing an arm 27. Within the tail housing 20 a servo-motor 29 is arranged, this motor having its piston 28 connected with the arms 27 and constituting a means whereby the angular positions of the blades about their own axes may be controlled.

Blades 22 may, through A-frames 21 and universal joints 25, cone with relation to the axis of the turbine shaft 18, the coning of each blade being independent of the coning of the other and being controlled by a coning cylinder 30 hereinafter to be more particularly described. Turbine shaft 18, at its forward end, is connected through step-up gearing 31 and a coupling 32 with a generator 34 of any suitable construction. The step-up gearing 31, through suitable connections 35 operates a hydraulic governor 36 and, likewise, provides a take-off drive 37 for a pump 38 providing fluid pressure which, controlled by the governor, as hereinafter more fully described, controls operation of the servo-motor 29. Fluid pressure may alternately, or in emergencies, be provided by an electric motor-driven pump 39, or by hand pump 40. Pumps 38, 39, and 40 draw from a common sump 67, and the pumps 38, 39 discharge into a pressure tank $p$. Pressure tank $p$ discharges to the pressure fluid inlet of the hydraulic governor, hereinafter to be described, through a line $p^1$. Hand pump 40 (Figs. 18, 34 and 37) may be selectively connected by valves $v^1$, $v^2$, and $v^3$ with the servo-motor of positioning mechanism about to be described, the operating motor of a yawing mechanism, or the clutch-actuating mechanism of a means for rotatably positioning turbine shaft 18.

It may be here noted that the inclination of the axis of the turbine shaft downwardly into the wind constitutes an important feature of the invention. Obviously, this arrangement will serve, in a large measure, to reduce the load placed upon the turbine shaft (a considerable factor in large units of the character under discussion) and to oppose end thrust in operation. It, furthermore, enables the shaft to be mounted with the blades overhung from the rear bearing but a short distance, while at the same time insuring clearance by the blade tips of the body of the tower 10. It, additionally, insures stability of the blades when at rest. Other advantages of the inclination of the axis will appear hereinafter.

*Blade-position controlling mechanism*

The positioning mechanism comprises the servo-motor 29, hereinbefore referred to, and the governor 36 (Figs. 16 to 26) which is a hydraulic compensated governor equipped with a speeder spring 41, the tension of which may be regulated through a motor 65$s$ and whose control of the servo-motor 29 is regulated as to limits through a pitch limit motor 65$a$. The servo-motor 29 has a rod 42 for its piston which is hollow and extends forwardly through a bore 43 in turbine shaft 18. The rod 42 is surrounded by a tube 44, the forward end of this tube being sealed to the rod as at 45 by connections permitting longitudinal movement of rod 42 while effecting a fluid seal thereto. Rod 42 at a point always disposed forwardly of the seals 45 without regard to the position of piston 28, is perforated as at 46. The turbine shaft is provided with two series of radial openings 47 and 48, the first series aligning with the space between tube 44 and rod 42, and the second series communicating with the bore 43 of turbine shaft 18 forwardly of the seals 45, and thus communicating with the interior of rod 42 through openings 46. Rod 42 is, at its forward end, sealed to the turbine shaft as at 49.

The governor 36 comprises a relay valve 50 controlling communication between a pressure fluid inlet 51 and connections 52 and 53 communicating, respectively, with the port series 47 and 48 of the turbine shaft, and it will be obvious that by shifting of this relay valve, fluid under pressure may be delivered either to the interior of rod 42 or to the space between this rod and tube 44 to thereby cause shifting of the piston 28 in a selected direction.

Figure 12:
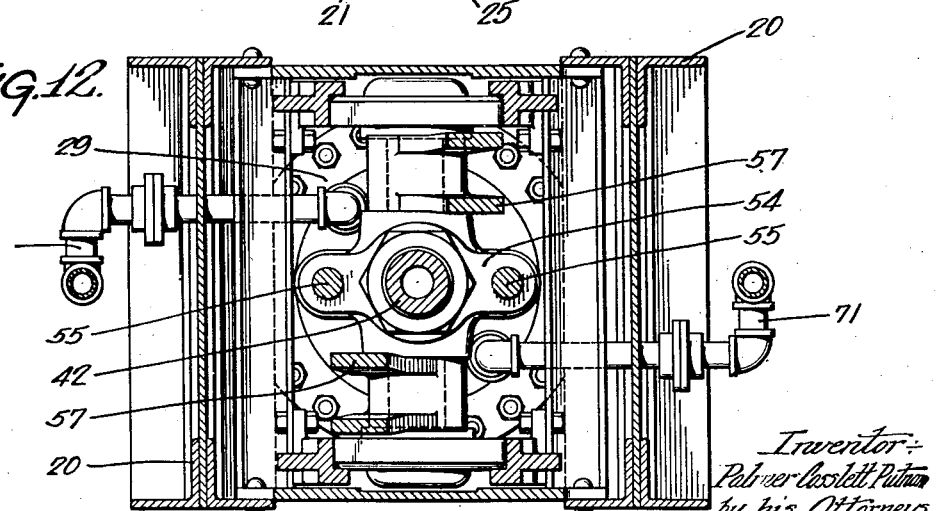
Fig. 12 is a section on line 12—12 of Fig. 10.

Secured to rod 42 is a cross-head 54 which, as more clearly shown in Figs. 10 and 12, operates upon guides 55 between adjustable stops 56. This cross-head is linked, as at 57, to the arms 27 of stub shafts 26 so that the position of piston 28 determines the angle of the blade chord to the plane of rotation. The movement of the piston is sufficient to shift the blades 22 through a selected angle, in the present illustration approximately 85°, lying between an angle of approximately 5° to the plane of rotation and an angle of 90° thereto, the latter angle being hereinafter referred to as the "feathered position" or that position in which the chord of the blade is coincident with the wind direction.

Figure 14:
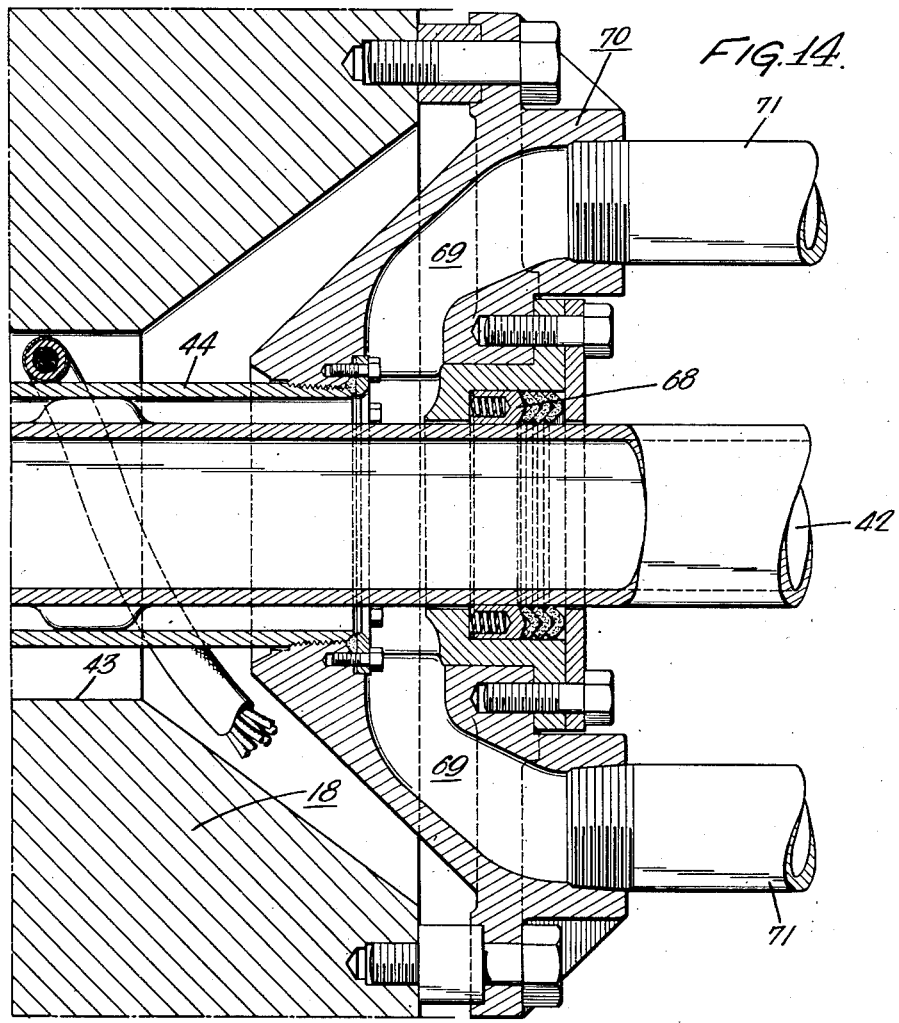
Fig. 14 is a detail sectional view through the forward end of the turbine shaft taken on line 14—14 of Fig. 15.
Figure 15:
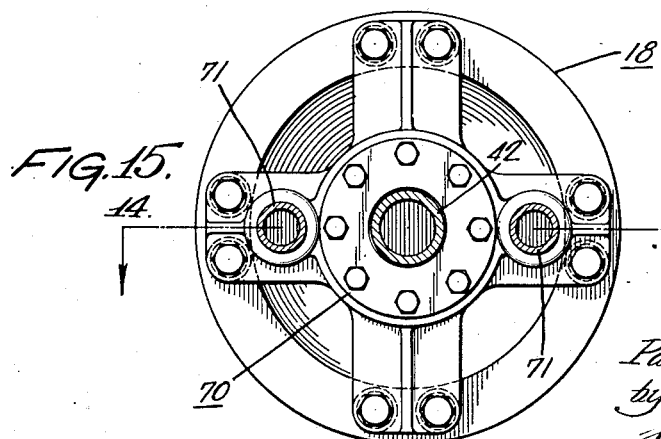
Fig. 15 is a rear elevation of the turbine shaft.
Figure 20:
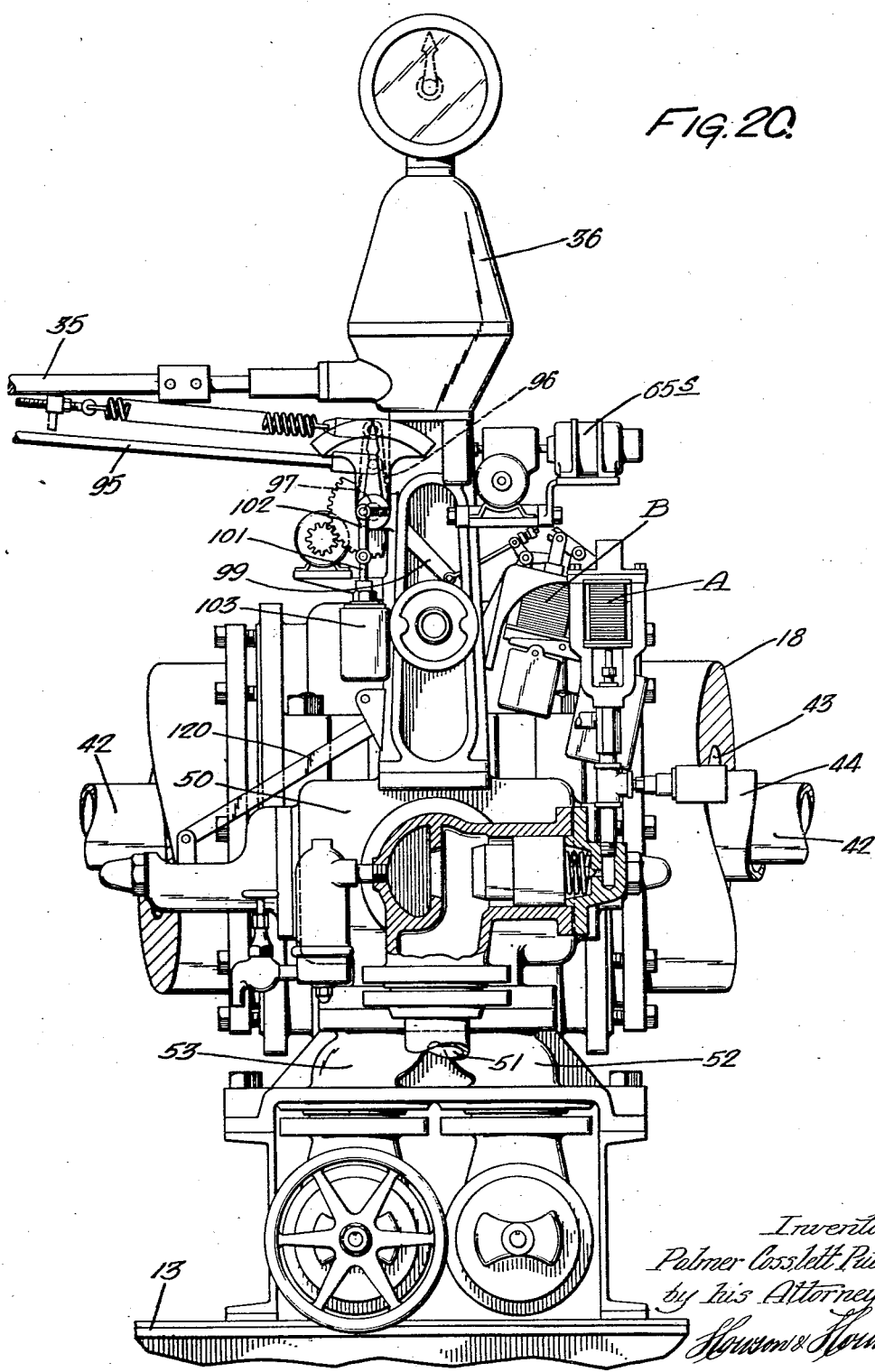
Fig. 20 is a front elevation of the governor mechanism.
Figure 21:
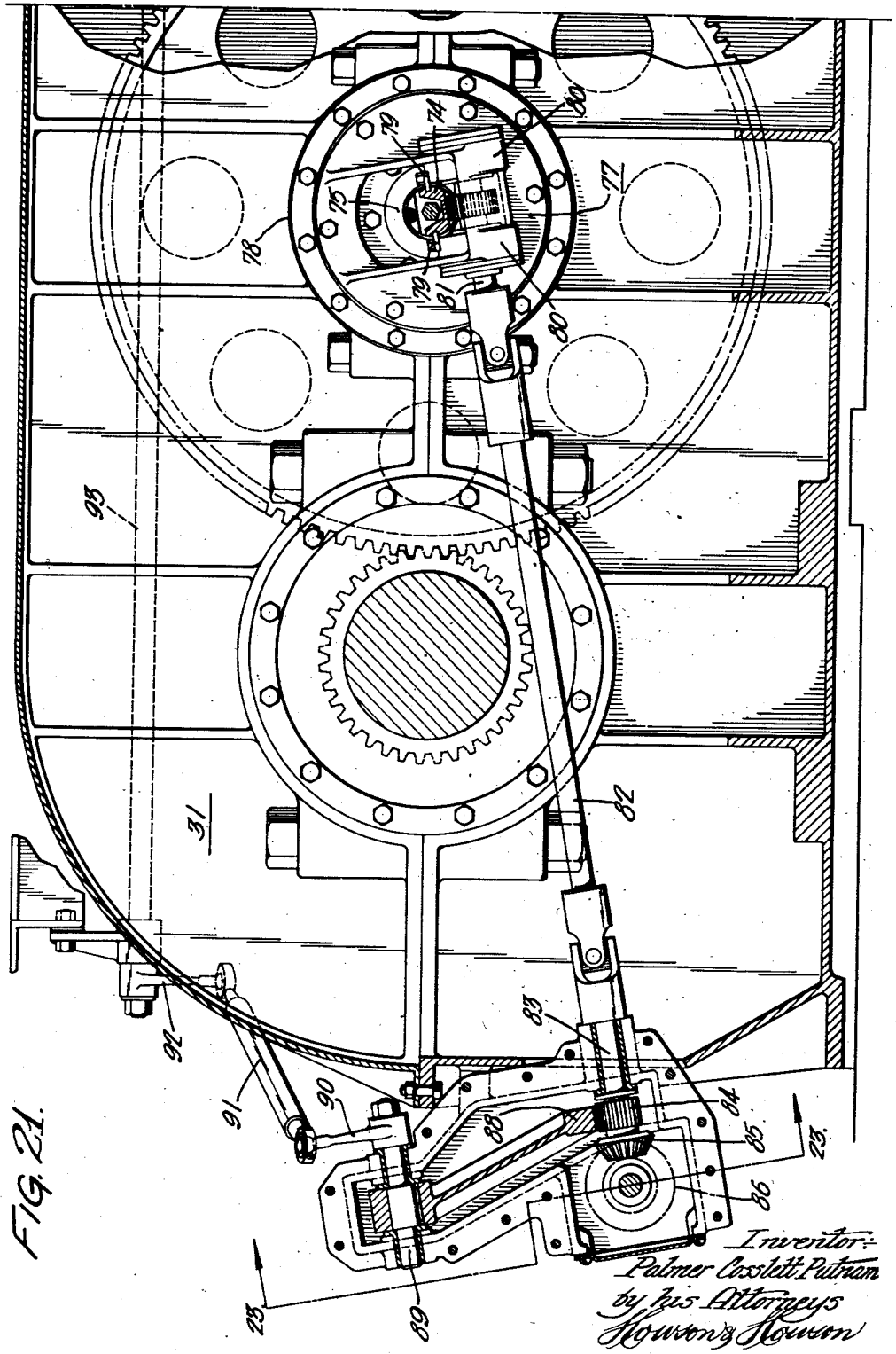
Fig. 21 is a section on line 21—21 of Fig. 4.
Figure 22:
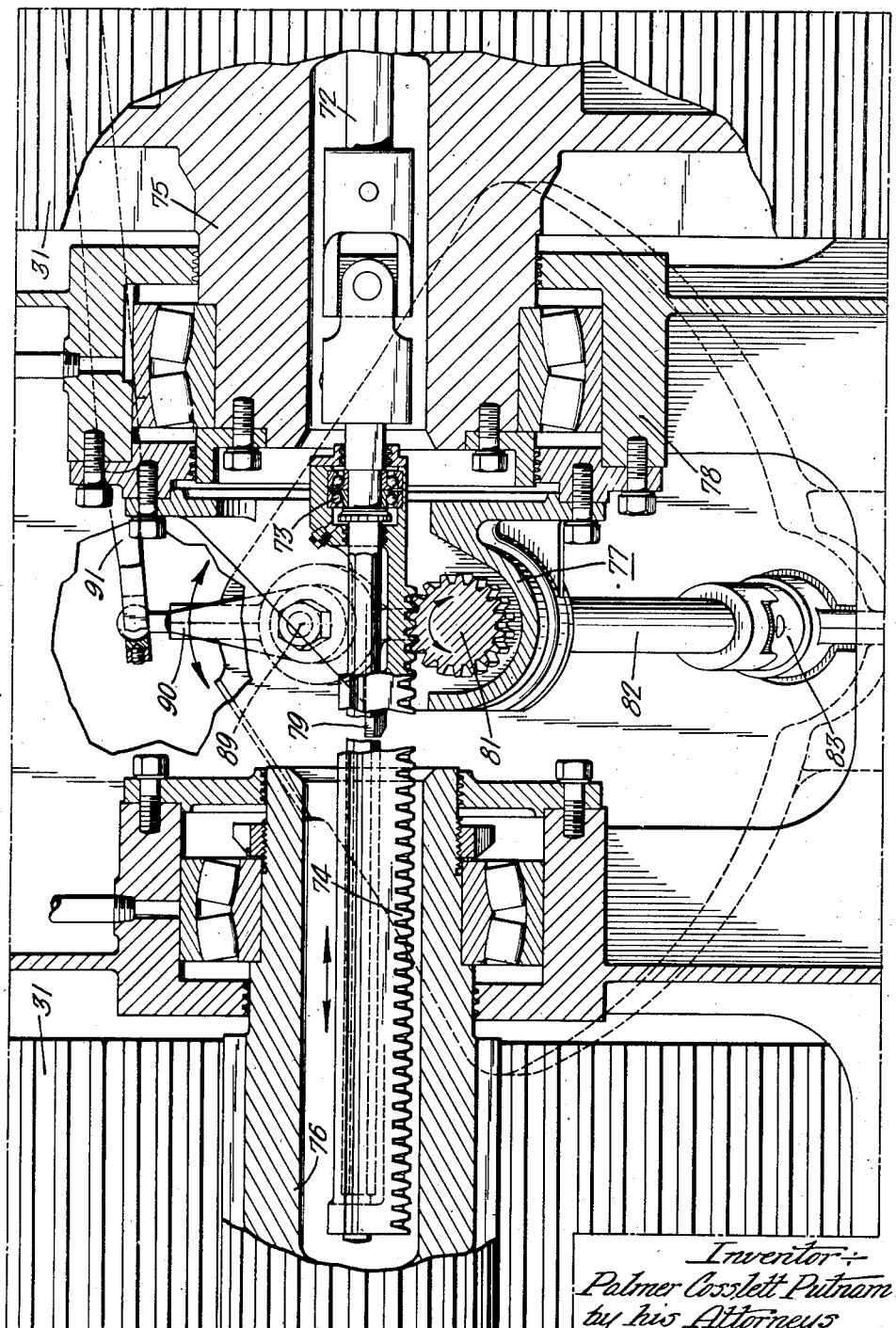
Fig. 22 is a section on line 22—22 of Fig. 4.
Figure 23:
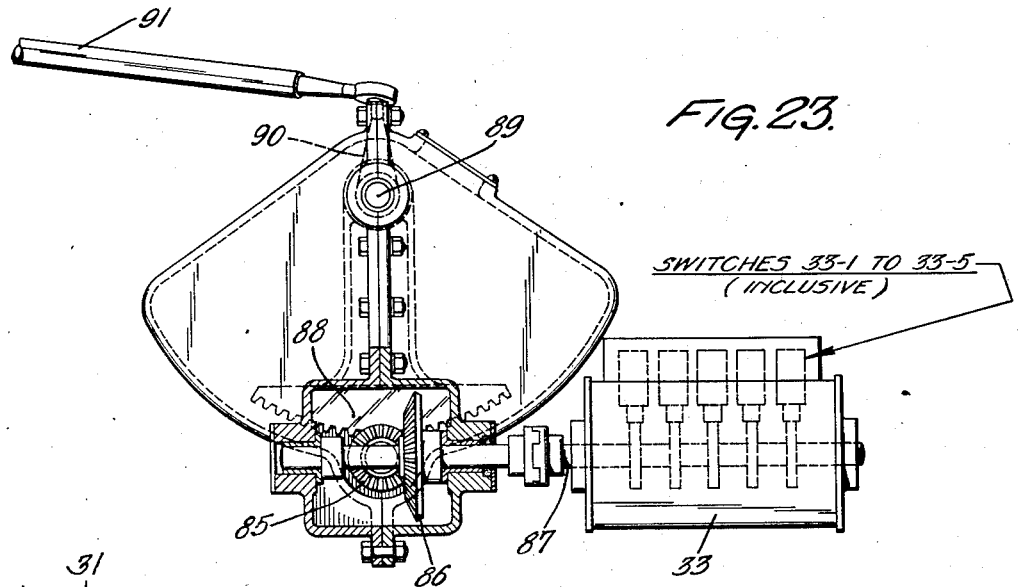
Fig. 23 is a section on line 23—23 of Fig. 21.
Figure 24:
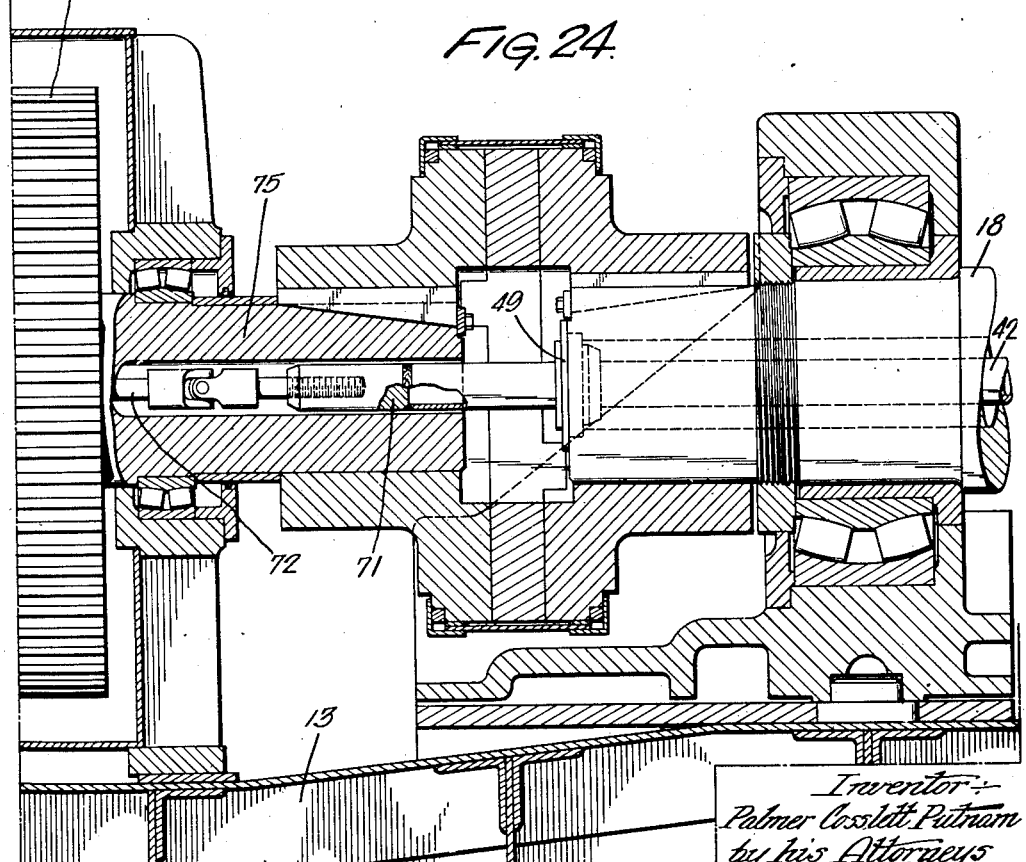
Fig. 24 is a vertical sectional view through the connection of the rear end of the turbine shaft to the speed-up gearing.

The condition may arise, when the turbine is operating under a wind velocity greater than approximately 30 miles per hour and the blades, accordingly, arranged at a relatively high pitching angle, wherein there is a sudden drop in wind velocity requiring an immediate movement of the blades to the flat or 5° position. The governor response will be fairly rapid, and in order that the completion of the blade movement may not be too abrupt, the rear end of motor cylinder 29, or that end which piston 28 approaches when moving the blades toward the flat position, is equipped with a cushioning mechanism including a valve 58 which is normally slightly unseated, the extent of the port provided by this unseating being regulatable as at 59. The seat of the valve has a tubular extension 60, and the end of rod 42 projects through the piston 28, as indicated at 61. This end has a slightly tapered portion 63 adapted to enter into tubular extension 60 and to approximately fit therein. When this extension has entered the tubular portion of the seat, fluid trapped by the piston and the rear end of the cylinder must pass through ports 64 and through the space between the check valve and its seat before it may enter the bore 66 of rod 42 and thus return through the governor to the sump 67 of the hydraulic system. Tube 44 (Fig. 14) has its rear end packed to the rod 42, as at 68, and its interior connected to the forward end of servo-motor cylinder 29 through ports 69 in packing head 70 and conduits 71 connecting these ports with the cylinder.

Rod 42 (Figs. 19, 22 and 24) has its front end packed to the shaft 18 as at 49 and is universally connected through shaft 72 with a swivel joint 73 at the forward end of a rack 74, shaft 72 and rack 74 being adapted for operation in the hollow interiors of aligned shafts 75 and 76 forming a portion of the step-up gearing 31 and of which shaft 76 is connected to the generator through the hydraulic coupling 32 hereinbefore mentioned. Rack 74 is splined in a support 77 carried by a bearing 78 of shaft 75 as at 79. The support 77, likewise, provides bearings 80 for a pinion shaft 81, the pinion of which engages rack 74. The pinion shaft 81 is universally connected through a shaft 82 with a stub shaft 83 (Fig. 21) bearing a pinion 84 and a bevel gear 85. Bevel gear 85 meshes with a gear 86 driving the cam-operating shaft 87 of a series of limit switches 33 (Fig. 23) including switches 33—1, 33—2, 33—3, 33—4, and 33—5. Pinion 84 serves to oscillate a segment 88 the pivot shaft 89 of which has an arm 90 secured thereto. This arm is connected by a link 91 to a crank 92 upon a shaft 93. Shaft 93 bears a second arm 94 which is, in turn, linked as at 95 to a crank arm 96 upon a governor compensating shaft 97 (see Figs. 25 and 26). The governor compensating shaft has an eccentric 98 embraced by one end of a control arm 99, the other end of which is supported at variable levels through a cam 100 selectively positioned by a motor 65a. Motor 65a simultaneously with operation of cam 100 actuates a series of blade-position-limiting switches 33a, including switches 33a—1, 33a—2, 33a—3, and 33a—4, the purpose of which will hereinafter appear. Shaft 97 is, in addition, linked at 101 to the stem 102 of a dash-pot piston 102a operating in a chamber 103 centrally divided by a partition 104. The space at opposite sides of the partition has an adjustable leakage port 105 regulatable through needle 106 and provides a cylinder opposite ends of which are in free communication with the chamber at opposite sides of the partition and in which operates a piston 107. Piston 107 is normally maintained in a selected position through an extension-compression spring 108, and the upper end of its stem is connected to one end of a lever 109, the opposite end of which is pivoted to the governor rod 110 which is directly controlled by the fly-balls 111 of the governor.

In the diagrammatic illustration (Figs. 25 and 26) the fly-balls are illustrated in what is their normal position under selected operating conditions, and any movement of the balls in the direction of the associated arrow will tend to depress rod 110. This tendency of the balls to move in this direction is resisted by the speeder spring 41 the tension of which is regulated through motor 65s as hereinbefore noted. As at present illustrated, the speeder spring seats upon a spiral gear 112 which is in the form of a nut threaded upon a suitable support 113 as at 114. Rotation of motor 65s in one or the other direction will cause a tensioning or relaxing of spring 41, thus controlling the spring pressure exerted to shift rod 110 under influence of the centrifugal force of the fly-balls. The position of the gear 112 as determined by motor 65s is limited by a switch series 33s, including switches 33s—1, 33s—2, 33s—3, and 33s—4.

The relay valve casing 115 mounts a pilot valve 116 controlling the actuation of relay valve 50. The stem of this pilot valve is linked, as at 117, to a bell crank 118 connected to the stem 119 of relay valve 50 by a link 120, the connections being such that the link has its bell-crank-connected end raised or lowered in accordance with the position of relay valve 50. A rod 121 connects levers 109 and 117, the connections between the rods and levers occurring between the ends of the levers. Vertically slidably mounted upon fly-ball-actuated rod 110 is a sleeve element 122, the lower end of which slidably embraces rod 121, as at 123. Rod 121 is provided with a vertically adjustable stop nut member 124 against which the lower end of the sleeve extension engages when rod 121 has been elevated to a predetermined extent, as will occur when the fly-balls drop toward the shaft of the governor head from the position illustrated. Sleeve 122 is engaged by one end of a lever 125 the opposite end of which engages a lug 126 on control arm 99. It will be obvious that the position of cam 100 will, therefore, determine the limit to which rod 121 may elevate and, accordingly, will determine the flattest position which may be attained by blades 22 under governor-controlled operation of the servo-motor 29. The motor 65a, therefore, serves as a pitch limit motor determining the flattest pitch attainable by the blade, i. e., the smallest chord angle to the plane of rotation of blades 22. It will also be obvious that the motor 65s serves as a means for regulating the maximum speed of rotation which may be attained by the driving element, turbine shaft 18, since it will determine the position of blades 22 through servo-motor 29 and thus determine the speed of rotation of the turbine shaft at any given wind velocity. Motor 65s may, accordingly, act as a means for regulating the speed of turbine shaft 18 when synchronizing generator 34 and when the latter is under load.

The mechanism including rack 74, and the train of mechanism connecting this rack with compensating shaft 97 of the governor, serves to restore this relay valve to a neutral position when the governor demands have been met. When the blades 22 shift in response to a governor demand, movement of rod 42 will cause a corresponding movement of shaft 97 of the governor. This shaft, by actuating the dash-pot plunger 102a, causes a corresponding actuation of piston 107. This piston, in turn, actuates lever 109, and, through this lever, rod 121, lever 117, and pilot valve 116. The actuation of the pilot valve will be, as is usual in devices of this character, of an order such as to supply fluid at the opposite end of relay valve 50 from that at which it had been originally supplied, thus shifting the relay valve to the neutral position, following which the link 120, operating through bell crank 118 and lever 117, will act to return and maintain the pilot valve 116 in its neutral position. It follows then, that for any displacement of the governor fly-balls out of the plane of their normal orbit of rotation in response to a change in speed of the turbine shaft 18, there is a corresponding change in the angular position of the blades 22 with respect to the wind, excepting, of course, such times as when the pitch limit mechanism is effective.

However, it will be apparent that the speed of the turbine shaft 18 does not respond to the change in the setting of the blades 22 as quickly as the servo-motor 29 responds to the setting of the relay valve 50. Consequently, the fly-balls 111 will still be out of their normal orbit of rotation when the pilot valve 116 is returned to its neutral position, as noted above. With the speeder rod 110 still in its depressed position, and the piston 107 still in its elevated position, the return of the piston 107 to its normal position by the centralizing spring 108, is timed by means of the compensating dash-pot needle valve 106. Obviously, if this timing is adjusted to correspond to the time required for the fly-balls to return to their normal orbit of rotation in response to the speed change of the turbine shaft, then the lever 109 will fulcrum on rod 121 and the return movement of the piston 107 will compensate for the return movement of the speeder rod 110, thus maintaining the valve 116 in its neutral position subject to the further demands of the governor as limited by the speeder spring setting.

The mechanism connecting rack 74 and shaft 97, as hereinbefore noted, includes a means for actuating the switch series 33. It may be here noted, as will here nafter be more fully described, that under emergency conditions wherein the blade is moved to the feathered position, the series 33 includes a switch 33—4 (Fig. 49) by means of which a solenoid A controlling the supply of fluid pressure to the governor-controlled relay valve is cut off, this switch only becoming effective when the blades 22 have reached the full-feathered position. The series further includes a second switch 33—5 (Fig. 37) which operates when the blades have reached full feathered position to activate a circuit controlling the braking means hereinafter to be described.

Assuming that there is no wind and that the unit is stopped, the blades 22 will then be disposed at the rest position which may arbitrarily be assumed to be a position of about 30° to the plane of rotation, the governor speed adjustment controlled through speeder spring 41 being then at the normal low limit, having been stopped at that position by the limit switch 33s—1, as hereinafter more particularly noted. With an increase in wind velocity, the propeller, by its increasing speed, reaches a predetermined rotative velocity which may, for the purposes of this description, be set as approximately 5% of the rated velocity at which the turbine will produce sufficient energy to enable the generator 34 to be placed on the line. At this time low speed switch 14 initiates, through a suitable delay mechanism, actuation of pitch limit motor 65a and establishes a pitch limit for the blades at their maximum speed adjustment or efficiency angle in a wind velocity at or above a selected minimum. This angle may be arbitrarily assumed to be 5° to the plane of rotation and as long as the rotative velocity of the propeller remains below the rated speed, say 30 R. P. M., the governor will activate servo-motor 29 to shift the blades toward this position.

When the speed of turbine shaft 18 reaches the speeder spring setting (the normal low limit previously mentioned), the governor fly-balls 111 assume control of the turbine, following which the generator may be synchronized with the line which it is to feed providing, as will hereinafter more fully appear, the pitch angle of the blades is not below a predetermined setting as, for example, the 9° setting, thus insuring that there is sufficient wind velocity to warrant synchronization of the generator in event of a slight drop of such velocity. Obviously, loading of the generator will cause a decrease in speed of the unit, which must be compensated for by shifting the blades thereof. If the velocity of the wind is sufficiently low that rated speeds may be developed only between the 5° position of the blades and the selected on-line position, the generator will operate idly until the wind velocity has increased to a point such that the governor in maintaining this rated velocity has, through servomotor 29, shifted the blades to an angle greater than the selected on-line position.

Assuming that all these conditions have been met, the generator is placed on the line, as hereinafter more fully described. At this time, the unit is running at its rated speed but is under no load, the loading of the generator being accomplished through changes in the governor speeder spring setting through motor 65s. In the design under discussion, full loading of the turbine will be completed at a wind velocity of approximately 30 miles an hour, the unit at lower velocities delivering whatever power may be imparted thereto by the wind. Increases in wind velocity will merely result in variation of the blade angles through governor control to maintain the blade angle such that uniform speed of the turbine will be provided. Should the wind increase in velocity to a point such that it is impossible to maintain turbine shaft 18 at its rated R. P. M., with a blade angle less than a selected angle which may be arbitrarily set as approximately 28°, the blade movement recorded through the switch series 33 will institute an "unloading" operation through which the generator will ultimately be removed from the line. The unit will continue to operate under the control of the governor at synchronous speed until the wind velocity slackens to a point such that the blades again return close to their operative angle, that is to say, an angle somewhat greater than the approximate angle of 28° hereinbefore mentioned. When the wind velocity has fallen to a point such that the generator output decreases to a predetermined low value, a suitable timing device, hereinafter to be described, will institute a shut-down cycle removing the generator from the line, the turbine continuing to operate under governor control at or below its rated speed according to the wind available, the blade angle at this time being between the 9° minimum synchronizing angle and the flattest blade angle. Should the wind velocity fall to such a point that the rotational speed of turbine shaft 18 reaches a predetermined low, then low speed switch 14 will actuate pitch limit motor 65a and return the blades to the 30° rest position.

Under certain emergency conditions, and without regard to wind velocities or the rotative speed of turbine shaft 18, operation of a protective device, hereinafter more particularly noted, will trip the generator and cause the synchronizing motor 65s to run the speed adjustment to an extreme lower limit controlled by limit switch 33s—2 and, correspondingly, to a half-rated speed of the turbine in a given time. Simultaneously, through actuation of a time-delay relay hereinafter noted, deenergization of solenoid B will be instituted and the blades will move to full-feathered position at a selected rate under control of a suitable timing device such as that formally designated in the diagram forming Figure 26. When the blades have reached full-feathered position, limit switch 33—4 will energize solenoid A cutting off oil pressure to the governor.

Yawing mechanism

Due to the construction adopted wherein the blades are disposed down-wind and to the ability of these blades to cone, the rotatable unit structure at the head of the tower is inherently stable and will tend to yaw automatically without the assistance of a tail vane. This tendency to yaw automatically may be further increased by providing both the platform and the tail housing with a suitably streamlined cowling c, that at present illustrated being formed in stationary and rotating sections supported from and enclosing the platform and the tail housing respectively.

However, in order to prevent possibility of the turbine being taken aback through a complete reversal of wind direction following a calm, I include means for positively yawing the turbine to insure maintenance of the blades in a position transverse to the general direction of movement of the wind. It is also necessary in a mechanism of this character that some means be provided whereby the apparatus can be positioned at will to dispose the blades or other portions of the mechanism in proper alignment with accessories, such as anchoring devices (not shown) provided upon the tower for anchoring the lowermost of the turbine blades. As hereinbefore noted, the platform 13 forming the supporting base for all of the mechanism hereinbefore described, is rotatably mounted upon the upper end of the tower through pintle shaft 11, and the platform may be rotated through operation of a pinion 17 engaging a stationary gear 16 which is fixed to the tower. For the purpose of effecting automatic positioning of the unit (Figs. 28 to 35), the forward end of the platform 13 mounts, through suitable bearings 128, a yawing vane 129, this yawing vane being secured to the upper end of a shaft 130 the lower end of which projects into a housing 131 supported from a suitable standard 132. The upper end of standard 132 has secured thereto a base 133 mounting a pilot valve 134 and a damping mechanism 135. Secured to the lower end of the shaft 130 and rotating therewith is a plate 136 having formed therein a cam slot 137. Rotatable upon a pivot 138 is a lever 139 one arm of which is equipped with a roller 140 extending into the cam slot 137 and the other arm of which is connected to the stem 141 of the movable valve element 142 of pilot valve 134. The pilot valve is connected with the pressure tank p through a supply line 143 and this valve, as more clearly shown in the diagram forming Fig. 34, is of the three-way type selectively connecting the pressure source with operating lines 144 and 145, and providing for the discharge from the disconnected line 144 or 145 to a discharge line 146.

The damping mechanism comprises a reserve chamber 147 into which discharge line 146 discharges and from which a line 148 leads to the sump 67. This damping mechanism further includes a cylinder 149 having arranged therein a pair of spaced pistons 150 mounted on a common rod 151. Rod 151 is connected to plate 136 as at 152 for actuation upon rotative movement of this plate. It will be obvious that upon movement of rod 151 in either direction pressure will be generated in either end of cylinder 149 and opposite ends of these cylinders are connected to one another through an adjustable needle valve 153. In addition, pistons 150 are provided with small leakage ports 154 and it will be noted that any interchange of pressures between the ends of the cylinders must take place either through these leakage ports or the adjustable needle valve 153. The damping mechanism, thus, comprises an adjustable dash-pot preventing "hunting" of the yawing mechanism as a result of fluttering in vane 129.

The yawing mechanism further includes a battery of control valves indicated at 155, 155a, 156, 156a, the general construction of which is illustrated in Fig. 35. As shown in this figure, each valve comprises a chamber 157 having ports 158, 159, 160 and 161. The valve is of the solenoid-operated type, normally spring-maintained in one position in which ports 158 and 160 are maintained in communication with one another and ports 159, 161 are likewise in communication with one another. Upon actuation of the solenoid s, pistons 162 close ports 158 and 159 and place ports 160, 161 in communication with one another. Under normal automatic control, the position of the valves 155, 155a, 156, 156a is as illustrated in Fig. 35, and in this automatic operation valves 155 and 155a form the sole control. These valves have their ports 158, 159 reversely connected with the operating lines 144, 145 of pilot valve 134, the other of the ports 158 or 159 being connected with the discharge line 146 of the pilot valve and, more particularly, with the line 148 leading from the reserve chamber 147 to sump 67. Ports 160 are connected through lines 163 to opposite ends of the operating cylinder of the control valve 164 which may be as illustrated in Fig. 36. This valve is of the same type as pilot valve 134 but is fluid-pressure operated. The piston body 164a of the valve is normally centrally positioned and the ports thereof are so arranged that the inlet 165 is normally sealed from the outlets or supply lines 167. Introduction of fluid pressure to either end of the valve will, however, cause a shift of the valve body 164a connecting one of the lines 167 with the inlet 165 and the other of the lines 167 with the outlet 166. The inlet of valve 164 is connected, as at 165, with the pressure tank p, the outlet, as at 166, to sump 67, and the supply lines, as at 167, to the terminals of a rotary motor 168 operating pinion 17 through reduction gearing generally designated at 169. It will be noted that through lever 139 any movement of vane 129 from its normal central position will be translated to a longitudinal shifting movement of valve 142. Fluid pressure will, thus, be introduced through valve 155 or 155a to one end of the operating cylinder of valve 164, thereby shifting this valve and introducing fluid pressure to cause operation of the yaw motor 168 in one direction or the other with a corresponding movement of the platform 13. Movement of platform 13 will, of course, correlate the position of the platform with the position of vane 129, thereby restoring plate 136 to its normal central position and discontinuing operation of motor 168. As hereinbefore noted, the damping mechanism serves to prevent "hunting" movements of the platform and this will hold true not only as regards resistance to fluttering movement of the vane 129, but likewise as to any tendency of the mechanism to overthrow in the yawing movements.

Valves 156, 156a hereinbefore noted are employed when it is desired to control yawing manually. During periods of manual control through switch 170 the valves 155, 155a are so disposed that their ports 160, 161 are in communication with one another. Valves 156, 156a each have port 158 thereof closed as by plug 171, while port 159 is connected to discharge line 148 leading to the sump. The ports 160 of these valves are connected with the pressure tank p and ports 161 thereof are connected to the corresponding ports of valves 155, 155a. The solenoids of valves 156, 156a are under control of switches 172, 172a and it will be obvious that upon actuation of either of these valves pressure will be transmitted from one to the other of the ports 161, 160 thereof and thus transferred to the associated valve 155 or 155a and thus to the operating cylinder of motor-controlled valve 164. In the meantime, the other of the valves acts with the associated valve 155, 155a to maintain a discharge connection from the opposite end of the operating cylinder of valve 164 to sump 67. As will be noted from the diagram forming Figure 34, hand pressure pump 40 is connected to the supply lines of valves 156, 156a forming a reserve supply means in event of failure to the normal pressure lines.

*Turbine shaft positioning mechanism*

Obviously, in servicing a mechanism of this character, it is often desirable that the turbine shaft be selectively positionable in order that the blades, or some other portion of the mechanism associated therewith, may be rendered readily accessible, such adjustment being ordinarily employed in conjunction with the manual regulation of the position of the platform through the yawing mechanism just described. To this end, I mount (Figs. 37-43) preferably upon the output shaft 173 of the step-up gearing 31, one member 174 of a clutch, the second member of which is rotatable about the shaft as at 175. This second member may be connected to or disconnected from the member 174 by suitable mechanism indicated at 176, and actuated from a hydraulic cylinder 177 the supply to which may comprise the hydraulic system including pressure tank p and may be controlled by a valve 178 (Fig. 37) similar in construction to the valves 155 hereinbefore referred to. The operating mechanism connecting the hydraulic cylinder 177 with the clutching mechanism 176 comprises a linkage 179 one element 180 of which includes an operating cam 181 actuating a switch 182 Figures 38 and 48 through which the starting cycle of the turbine is rendered ineffective at any time when the clutch mechanism 176 is operative. The normally idle member of the clutch 175 is peripherally formed as a gear 183 engaged by a pinion 184 upon the output shaft 185 of reduction gearing generally designated at 186. This reduction gearing is driven from the the shaft 187 of a motor 188, or optionally through further reduction gearing indicated at 189 by means of hand cranks 190. A clutch mechanism operated through handle 191 serves to connect and disconnect the hand crank mechanism 190 from the reduction gearing 186, this hand crank operating the shaft 192 and, through this shaft and shifting fork 193, an intermediate gear 194 of reduction gearing 189. Lever 191 additionally actuates a switch 33r, this switch being open when the intermediate gear 194 is positioned to connect the hand cranks with the reduction gearing 186 and being closed when the hand crank mechanism is disconnected. In its latter position the switch 33r, subject to a manual switch 33b, controls the circuit of motor 188 and, as more clearly shown in the diagrammatic view of Fig. 40, likewise controls a brake mechanism generally designated at 195. As at present disclosed, this brake comprises a pair of shoes 196 normally frictionally engaged with a brake drum 197 on shaft 187 through a spring 198. A solenoid 199 has its armature 200 linked to the shoes 196 in such manner that when the solenoid is energized the brake shoes are disengaged from the drum. This solenoid is disposed in the motor circuit so that when the motor 188 is energized, as through operation of switch 33b, solenoid 199 is activated rendering the brake mechanism 195 inoperative. This mechanism may, obviously, be considerably varied and in its preferred form may comprise one of the usual braking mechanisms associated with, and built into as an integral part of, the motor 188.

In use of the mechanism just described, the switch 201 controlling the operation of solenoid valve 178 is first employed to engage the clutch elements 174, 175, operation of the actuating cylinder 177 closing switch 182 in order that a starting cycle of the system may not be initiated while the clutch elements are engaged. Assuming that power is available for the operation of motor 188, this motor may then be utilized to rotate the turbine shaft and place the blades at a desired position for repair or inspection. If current is not available, lever 191 is operated to render the hand crank mechanism available and positioning of the shaft may be effected therethrough. Under such circumstances it is necessary that the brake mechanism 195 be rendered inoperative and solenoid 199 is illustrated as having its armature 200 provided with a cam mechanism 202 through which this may be effected.

Coning mechanism

As a means for controlling the speed of operation of the turbine and for protecting the blades of the same and the associated mechanism against damage during gusty periods, means are provided (Figs. 44 to 47) whereby these blades may independently and automatically assume a coning position; that is to say, a position where they are at an angle other than 90° to the turbine shaft 18. As hereinbefore set forth, each blade, and more particularly that portion of the blade which is rotatable about its longitudinal axis, is connected to tail housing 20 and the casting 19 to which this tail housing is affixed through a pivoted A-frame 21. To the rear end of the tail housing 20, I pivot a pair of levers 203, these levers being aligned with the associated blades 22 and being connected to the outer ends of the respective A-frames of the blades 22 by links 204. Each lever 203 is connected intermediate its ends to the rod 205 of a piston 206 operating in the coning cylinders 30 hereinbefore noted. Coning cylinders 30 are pivotally mounted, as at 208, in brackets 209 carried by the tail housing 20 and operate independently of one another.

Each coning cylinder has arranged in opposite ends thereof cushioning elements at present shown as comprising springs 210 engaged by abutment elements 211 which, adjacent the limits of movement of the piston 206 in either direction, are engaged by the piston and compress the springs. The abutment elements are mounted upon guides 212 which, in addition to guiding these abutments, serve as positive stops limiting the movement of the piston. For the purposes of description, it will be presumed that positive coning, that is to say, down-wind coning will be limited at a twenty-degree angle to the axis of the turbine shaft 18, and up-wind or negative coning will be limited, for example, at 3 degrees. The springs resisting final movement of the blades toward the negative coning angle are of greater resistance than those resisting the final movement towards positive coning, as these springs must resist the weight of the blades in the absence of wind and during those periods when the blades are in their full-feathered or approximately full-feathered position. Zero coning preferably occurs when the blades are in the position C⁰, Figure 1, and the piston in the position illustrated in Figure 44. At this time, it will be noted that the piston is so positioned that its further movement toward a negative coning position, i. e., toward the left in Figure 1 from position C⁰, will meet with the resistance not only of fluid within the cylinder but, likewise, with the resistance of springs 210 at the left-hand end of the cylinder.

Each cylinder has an independent fluid pressure system comprising conduits 213, 214 connecting the cylinder ends in parallel. The conduit 214 has arranged therein a pair of metering valves 215 arranged at opposite sides of a connection 216 between the conduits 213, 214. Metering valves 215 are by-passed by safety valves 217 which will permit by-pass of fluid around valves 215 in event the piston 206 tends to move so rapidly that the metering valves will not pass the fluid at a sufficient rate and the pressures generated in the cylinder become dangerously high. At opposite sides of the connection 216 between conduits 213, 214 oppositely opening check valves 218 are disposed, these valves opening at a predetermined pressure as, for example, 1,000 pounds. A surge cylinder 219 is connected in the system including conduits 213, 214 and their connection 216 at any point intermediate the pairs of valves employed therein, being at present shown as connected to the conduit 213 between the check valves 218.

In operation, assuming the pressure tending to cause a positive coning action is steady and exceeds the relative pressure of check valves 218, the fluid from the right-hand end of the cylinder will tend to pass the associated metering valve 215, and assuming that the tendency to movement of the blade is not excessive, will pass entirely through this metering valve and thence through the connection 216 to the conduit 213. Since the check valve 218 has its normal opening pressure reinforced by the pressure injected in the right-hand end of the cylinder, this pressure, assuming it is in excess of 1,000 pounds, will open the left-hand check valve 218 and thus pass to the left-hand end of the cylinder. If there is a sudden movement by either of the blades creating excess pressure in one end of the cylinder, the associated safety valve 217 will open by-passing to valve 215 and delivering pressure to the conduit 213 and, incidentally, to the surge cylinder 219. Surge cylinder 219 has arranged therein a spring-pressed piston 220 which will yield to permit the necessary blade movement but will act to finally redeliver the fluid thus displaced from the normal system to the conduit 213 and thus to the opposite end of the cylinder. Surge cylinder 219 serves not only as a means for compensating for excess demands placed upon the system but, likewise, serves as a means for maintaining the main cylinder and the associated hydraulic system full.

It will be obvious that when either blade is subjected to a sudden gust, it may move to a coning position independently of the other of the blades, this arrangement being, as hereinbefore pointed out, not only desirable but essential in a unit of the size of that proposed in the present application, since the blades will be subjected to gusts of substantially varying intensities; for example, a blade extending vertically upwardly from the turbine shaft would be subjected only to upper strata wind which, as hereinbefore pointed out, is fairly steady and subject to only mildly variable gusts whereas the opposed blade arranged adjacent to the ground would be subjected to ground gusts which vary considerably in their intensity. This independent coning will, therefore, serve to, in a large measure, eliminate jerky operation as a result of gusts. Furthermore, the ability of these blades to cone affords an inherent protection for the unit under winds of gale velocities.

It may be here pointed out that coning of the blades not only will assist in control of speed of the turbine, as effected by the pitching mechanism, and relief of strains under sudden gusts affecting one or the other or both blades, but it will, likewise, in combination with the inclination of the axis, serve to maintain the blades at such angles to the vertical as they will be best presented to the velocity gradients at different points in their rotation, thereby partially compensating for the velocity gradient across the diameter of the area swept by the turbine blades. Since, in many instances, it is possible to permit unrestrained coning of the blades, means are provided such, for example, as bleed valves 215a whereby the fluid may be drained from opposite ends of the coning cylinder.

Position responsive switches

In order to describe clearly the functioning of the electrical control circuits illustrated in Figs. 48 and 49, it is necessary first to explain more fully the character and operating characteristics of the position-responsive switches in the three groups hereinbefore designated as 33, 33a, and 33s. A clear understanding of these switches may be had by reference to Figs. 50 to 52 which show graphically the ranges of operation of these various switches.

As previously described, the 33 switches are operated by the blade-positioning mechanism shown in Fig. 25 so that the condition of these switches at any time is directly dependent on the blade angle. These switches may be of the simple cam-operated type, that is to say, a series of cams fixedly mounted on a common shaft may be rotated by means of gears 85—86 and these cams may operate the respective switches of the 33 group.

The 33a switches, which may also be of the cam-operated type, are positioned in accordance with the amount of actuation of the pitch limit motor 65a through gearing as shown in Fig. 26. Since the function of the pitch limit motor is to establish the limit of adjustment of the blade angle, the position of the 33a switches at any time will correspond to a particular blade angle, although the blades may not be adjusted to that angle.

The 33s switches are positioned in accordance with the actuation of the speed control motor 65s, these switches being driven by the motor through gearing as shown in Fig. 26. These switches may also be of the cam-operated type. Since, for a given wind velocity, the extent of operation of motor 65s determines the blade angle, and hence the torque at the turbine shaft, and since the speed and load conditions are dependent on the torque, the positions of the 33s switches correspond to different speed and load conditions of the unit.

With the above in mind, reference may now be had to Figs. 50 to 52. Fig. 50 illustrates graphically the operating ranges of the 33 switches in terms of the blade angle. The 90° position is the feathered position of the blade, while the 0° position represents the theoretical minimum blade angle. As mentioned above, however, the 5° position is taken as the minimum blade angle or pitch position. In the illustration of Fig. 50, the angular ranges through which the respective switches of the 33 group are closed are indicated by the shaded portions of the respective quadrantal arcs corresponding to the respective switches of the group as designated, while the unshaded portions of the arcs represent the ranges through which the switches are open. Thus, the 33—1 switch is closed at the 9° and 32° positions and at all angular positions therebetween. Likewise, the 33—2 and 33—3 switches are closed throughout the ranges indicated including the end positions of said ranges. It will be noted, however, that the 33—4 and 33—5 switches are open throughout the entire 90° range, but these switches close at the 90° position, or in other words when the blades reach the feathered position.

The illustration of Fig. 51 is similar to that of Fig. 50 and shows in like manner the operating ranges of the respective switches in the 33a group. In this instance also, the switches are closed at the end positions of their respective "closed" ranges and at all positions therebetween. For reasons which will appear hereinafter, it is important that the "closed" ranges of switches 33a—3 and 33a—4 do not overlap.

Fig. 52 illustrates in a similar way the operating ranges of the 33s switches but, as noted above, the positions of these switches correspond to different speed and load conditions of the turbo-generator unit, and, therefore, a different type of chart is utilized to illustrate their operating ranges. As will be seen from Fig. 52, there are four principal positions corresponding, respectively to 50% speed-no load, 90% speed-no load, 100% speed-no load, and 100% speed-full load. As shown by this chart, the 33s—1 switch is closed at and above the 100% speed-no load position; the 33s—2 switch is closed at and above the 50% speed-no load position; the 33s—3 switch is closed at and below the 100% speed-full load position; and the 33s—4 switch is closed at and above the 90% speed-no load position.

The illustrations of Figs. 50 to 52 will greatly assist in obtaining a clear understanding of the operation of the electrical control circuits now to be described.

Electrical control circuits and their operation

The electrical system which controls the operation of the turbo-generator unit is shown in Figs. 48 and 49. In considering this system, the sheets containing these figures should be placed end to end with Fig. 48 at the left.

The generator 34 feeds into the transmission line 221 through the circuit breaker 222 when the latter is closed. The control circuits illustrated in Figs. 48 and 49 are adapted to perform the following functions:

1. To bring the turbo-generator unit up to synchronous speed when prevailing wind velocity is adequate.
2. To place the generator on the line when it is properly synchronized with the line frequency.
3. To gradually load the generator until it is operating under full-load conditions.
4. To remove the generator from the line whenever the wind velocity decreases to such an extent that the generator load decreases to a predetermined minimum.
5. To remove the generator from the line when the wind velocity becomes excessive.
6. To effect emergency shut-down in response to abnormal conditions, such as over-speed.

The manner in which these functions are performed may be understood by reference to Figs. 25 and 26 in conjunction with the circuit diagram of Figs. 48 and 49. Some of the control elements are operated by the output current of the turbo-generator unit while others are operated by current derived from a control circuit comprising lines 223 and 224 which are connected to a suitable energizing source (not shown), for example a 110 volt (A. C. or D. C.) source. The system as a whole may best be understood by considering its operation in the performance of the above-mentioned functions.

As previously mentioned, the low-speed switch 14 is open at speeds below a predetermined low-speed, and this switch closes at the said predetermined low-speed and remains closed as long as the speed of the unit does not decrease below the said predetermined speed. As previously indicated, the minimum speed at which the control system commences its starting sequence in response to closure of switch 14 may be 5° of the rated speed of the unit.

*Starting sequence*

Assume first that the wind velocity is so low that the low-speed switch 14 is open and the generator is disconnected from the line, the unit being driven idly at low speed by the prevailing wind. This is the normal shut-down condition, which obtains by reason of low wind velocity, as described hereinafter. Under such circumstances, switches 33a will be in the 30° position, switches 33s will be in the 100% speed-no load position, and the various circuit elements will be in the condition shown in Figs. 48 and 49. In response to the low speed, the governor tries to increase the blade pitch, but the blades cannot be moved beyond the 30° position, which is the limit then established by motor 65a.

Assume now that the wind velocity increases sufficiently to increase the speed of the idly driven unit until the low-speed switch 14 closes. The closure of this switch energizes a timing relay 225 whose contacts 226 are closed at the end of a predetermined time interval. It is preferred to employ a timing device to initiate the starting sequence in order that such sequence will not be initiated by a temporary increase in wind velocity.

The timing relay 225 may be of any suitable form. For the purpose of illustration, a specific form of this timer is illustrated and comprises a small motor 227 arranged to drive a movable member 228 through a suitable reduction gearing 229 from a normal rest position against stop 230 in a counter-clockwise direction against the action of a return spring 231. When the arm 228 has traveled sufficiently, it engages a contact-carrying arm 232 mounted on leaf spring 233, thereby causing contact 234 to leave contact 235 and engage contact 236. This deenergizes the motor 227, permitting member 228 to be returned to rest position by spring 231, and at the same time energizes a holding electromagnet 236a for the arm 232. The upward movement of arm 232 also closes the contacts 226 above mentioned. In order that motor 227 shall not be deenergized before the holding magnet is energized, the contacts should be arranged so that contacts 234 and 235 remain closed until after contacts 234 and 236 are closed. This may be accomplished in simple manner by the use of spring fingers carrying contacts 235 and 236, as shown.

The closure of the timing relay contacts 226 at the end of the timing period energizes a master relay or contactor 237. The closure of relay contacts 238 energizes motor 65a through its field winding 239. The opening of contacts 240 prevents closure of the circuit through the other field winding 241 when switch 33a—4 closes. Motor 65a is thus operated in a direction to establish the 5° limit of the blade angle after a time interval, and, when it reaches this limit position, the motor is deenergized by the opening of switch 33a—1. The blades follow the limit motor until the opposing force of the speeder spring 41 is encountered, at which time the motor 65s assumes control.

The closure of the low-speed switch 14, in addition to initiating the above operation, closes an energizing circuit for the synchronizing control timer relay 243 which has a suitable time delay characteristic to delay the synchronizing operation until the motor 65a has operated to the 5° limit. As illustrated, timer 243 may be of the same form as timer 225, and the parts thereof are designated similar to those of timer 225. It will be noted that the switch 33—1 is included in the energizing circuit of timer 243 and, therefore, the timer is energized only if the blade angle is within the 9°-32° range as shown in Fig. 50. Thus, it is insured that the synchronizing sequence will not be started if the wind velocity is too high or too low for satisfactory operation. The operation of timer 243 closes the secondary circuit of potential transformer 248 and renders operative the synchronizing apparatus now to be described.

*Synchronizing operation*

The relays 244 and 245 are selectively operated in accordance with the frequency difference between the generator 34 and line 221, and these relays effect the operation of speed control motor 65s in a manner to bring the generator into synchronization with the line frequency. To this end, the windings of relays 244 and 245 are connected via conductor pairs 246 and 247, respectively, to the frequency matching circuits comprising potential transformers 248 and 249. The selective energization of these relays is dependent upon the relative phase rotation of the voltage across winding 250 with respect to the voltages across windings 251 and 252. Assuming a particular phase rotation of the two circuits involved, relay 244 is energized by the vectorial sum of the voltages across transformer secondaries 250 and 251 while relay 245 is energized by the vectorial sum of the voltages across transformer secondaries 250 and 252. Consequently, one or the other relay will be energized first depending upon whether the generator frequency is above or below the line frequency, and the selected relay is picked up once during each cycle of frequency difference and imparts impulses to motor 65s. It will be noted that the relays 244 and 245 are interlocked with one another by means of the contacts 253 and 254 so that when one relay picks up, the other one is locked out. Also, each relay is so designed that it drops out at a time when the vectorial sum of the voltages across the other relay is below its pick-up value, so that only one relay is picked up during each cycle of frequency difference.

Relay 244 operates in response to low generator frequency in comparison to the line frequency, while relay 245 operates in response to high generator frequency. The contacts 255 of relay 244 are included in a circuit for field winding 256 of motor 65s, while the contacts 257 of relay 245 are included in a circuit for field winding 258 of motor 65s. Normally closed contacts 259 and 260 of the respective relays 244 and 245 are included serially in an energizing circuit for a slow acting relay 294 which controls the closing coil 261 of circuit-breaker 222. Relay 294 is so designed that it picks up only when the frequency difference between the generator and line is substantially zero.

Assuming that the generator frequency is lower than the line frequency, relay 244 will be energized as above described, thereby impulsing motor 65s through its field winding 256 and causing the motor to operate in a direction to increase the tension of the speeder spring 41. This permits the governor to change the blade angle to increase the speed of the turbo-generator unit, thereby increasing the generator frequency. When the speed of the unit is such that the generator frequency matches that of the line 221, relays 244 and 245 remain deenergized and relay 294 picks up closing an energizing circuit for coil 261 via conductor 295. Consequently, the circuit-breaker 222 is closed to place the generator on the line. If synchronous speed is not reached with the blades within the 9°–32° range, switch 33—1 will open, thus deenergizing the timer relay 243 and opening the synchronizing circuits. When the blades again come within said range, synchronizing will be again attempted.

If the generator frequency happened to be higher than the line frequency, relay 245 would be energized, thereby energizing motor 65s through field winding 258, causing the motor to run in a direction to decrease the tension of the speeder spring 41, thus causing the governor to decrease the speed of the unit until the frequencies matched one another.

When the breaker 22 closes, switches 296 and 302 close. These switches may be arranged on the breaker as an integral part thereof. The closure of switch 296 completes an energizing circuit for a timer relay 287 which starts timing, said circuit extending from conductor 223 through switch 296, conductor 297, the contacts of under-power relay 285, conductor 298, contacts 234 and 235 of timer 287, and motor 227 to conductor 224. If the generator load does not increase to the value at which relay 285 operates (about 100 kw.) within the timing period of timer 287, the latter will energize relay 289 whose contacts 290 will energize the breaker trip coil 286 over conductor 299. Hence, the timing period of timer 287 should be such as to normally permit the operation of relay 285 within said period. The under-power relay 285 may comprise a wattmeter device 269 whose torque is opposed to the force of a spring 270 and tends to open the relay contacts.

*Loading of the generator*

When the generator is first placed on the line, it is operating under no load and simply floats on the line. At this point in the operating sequence, the generator is caused to take the load gradually under control of the load-responsive control relay 262 which controls the operation of motor 65s in a manner presently to be described.

The load-responsive relay 262 may take any suitable form and, for the purpose of illustration, it is shown as comprising a wattmeter device 263 whose torque is opposed to the force of a spring 272 and tends to drive a movable contact arm 268 counter-clockwise. In the specific illustration, the potential coil of the device is connected via conductor pair 264 across the potential transformer 248, while the current coil is connected via conductor pair 265 to a current transformer 266. While the device 262 is illustrated for simplicity as being of the single-phase type, it could, obviously, be of the polyphase type, as will be well understood by those skilled in the art.

For a given adjustment of the spring tension, the movable contact arm 268 will be positioned in accordance with the power supplied to wattmeter 263. The tension of spring 272 should be adjusted so that it is just balanced by the torque of the wattmeter when the generator is delivering the rated power.

Returning now to the loading of the generator, under no load conditions, the wattmeter 263 will exert substantially no torque, and, therefore, the movable contact arm 268 will be rotated by spring 272 into engagement with contacts 274. These contacts are included in an energizing circuit for relay 275, which circuit may be readily traced. Relay 275 picks up when voltage is applied to leads 264, closing its contacts, and thereby energizing a notching relay which may comprise a motor 276, the energizing circuit of which is connected across voltage leads 264, and a cam 277 driven by the motor to effect intermittent closure of a contact 278. The motor 276 is controlled by contacts 279 of relay 275, while the contact 278 is included in circuit with contacts 280 of the said relay. It will now be seen that motor 65s is intermittently energized through its field winding 256 and through switches 302, 33—3 and 33s—3. Thus, motor 65s is notched in a direction to increase the tension of the speeder spring 41, thereby permitting the governor to decrease the pitch of the blades as the generator takes the load. In other words, the increasing load of the generator requires increasing torque at the turbine shaft to maintain the speed, and this increasing torque is applied by causing the governor to decrease the blade pitch under control of motor 65s. It will be noted that the operation of motor 65s in a direction to cause decrease of the blade pitch is limited by the switches 33—3 and 33s—3 whose limits correspond, respectively, to the 5° blade limit and 100% speed-full load.

When the generator load increases to that corresponding to the setting of control device 262, the torque of wattmeter 263 counterbalances the force of spring 272 and causes contact 268 to assume an open position, thereby deenergizing relay 275 which drops out and interrupts the notching of motor 65s. If the generator does not take full load with the blade pitch within the 5° limit and with motor 65s operated to an extent not in excess of the 100% speed-full load position, either of the switches 33—3 and 33s—3 will open. The unit will then operate at less than full load until the wind velocity increases sufficiently to enable full loading.

If the generator load should rise above its rated value, for which the control device 262 is adjusted, the torque of wattmeter 263 will overbalance the tension of spring 272, thereby moving contact arm 268 counter-clockwise into engagement with contacts 281. The latter contacts close the energizing circuit of relay 282 whose contacts 283 close the circuits of the notching device 276—278. In this instance, the motor 65s is intermittently energized through its field winding 258 and operates in a direction to decrease the tension of the speeder spring 41, causing the governor to increase the blade pitch, thereby decreasing the torque at the turbine shaft and causing the generator to drop load until the load again reaches the rated value, when relay 282 is deenergized.

After the generator has been fully loaded, as above described, the turbo-generator unit will operate under control of the regulating device 262 to maintain the rated load. An increase or decrease in the load will effect operation of device 262 in a manner to energize one or the other of the relays 275 and 282, as above described, so as to operate the control motor 65s. As previously mentioned, the unit is preferably designed to operate during prevailing wind velocities of 30 to 60 miles per hour, and normal regulated operation will take place as long as the wind velocity is within this range.

Shut-down operations

Assume now that the wind velocity decreases to such an extent that the blade pitch is increased to the 5° limit established by motor 65a. This is the position for maximum torque at the turbine shaft and, if the wind velocity becomes insufficient to develop enough torque to hold the load, the load will decrease and, when it has decreased to about 100 kw., the under-power relay 285 will drop out, thereby energizing the timing relay 287 which, after a time interval, closes its contacts 288, thus energizing relay 289, which locks itself in through contacts 300 and switch 33s—1 which is closed. The closure of contacts 290 of relay 289 energizes the trip coil 286 of circuit-breaker 222, thus removing the generator from the line and opening switch 296 to trip timer 287. Simultaneously, the closure of contacts 291 of relay 289 energizes motor 65s through switch 33s—1. Consequently, motor 65s operates in a direction toward the 100% speed-no load setting at which switch 33s—1 opens.

With the generator off the line, the unit will run idly under control of the governor, and when the wind velocity increases sufficiently to cause the governor to move the blade within the 9°-32° range, switch 33—1 will close and again initiate the synchronizing cycle. The generator will be placed on the line and brought up to the full load as before If the wind velocity does not increase, but instead decreases to such an extent that the speed of the unit falls below 5% of the rated speed, the low-spaced switch 14 will open, thereby deenergizing the master contactor 237. The closing of contacts 240 will energize motor 65a through its field winding 241 and switch 33a—4 (now closed), causing the motor to run from the 5° limit position until it is deenergized by switch 33a—4 at about the 30° position, as shown in Fig. 51. Consequently, the blades will be moved to the 30° position which has been taken as the optimum position for re-starting the unit. At such time, the apparatus will be in the condition of normal shut-down from whence the foregoing description of its operation was started.

Assuming again that the unit is operating under load, suppose that the wind velocity increases beyond 60 miles per hour, the upper limit for normal operation. As the speed of the unit increases, the governor moves the blades toward the feathered position to compensate for the increase in speed and when the blade angle reaches 28°, switch 33—2 closes, thereby energizing the timing relay 287 which intitiates the shut-down cycle as previously described. When the wind velocity decreases sufficiently to cause the governor to bring the blades within the 9°—32° range, switch 33—1 closes to again initiate the synchronizing cycle.

Assume now that the unit is operating under load and the wind velocity increases suddenly to such an extent that the over-speed switch 292 is opened. This deenergizes solenoid B causing feathering of the blades under control of the mechanical timer associated with solenoid B as previously described with reference to Fig. 26. The opening of the over-speed switch 292 also deenergizes the normally energized relay 293 whose contacts close an energizing circuit for motor 65a through its field winding 241 and switch 33a—2. Motor 65a is thus caused to run in a direction to move the blade limit toward the feathered position until it is deenergized by the opening of switch 33a—2. The dropping out of relay 293 also closes a circuit for motor 65s through its field winding 258 and switch 33s—2. Motor 65s is, therefore, caused to operate in a direction toward the 50% speed-no load position where it is deenergized by the opening of switch 33s—2.

When the blades reach the feathered position, switch 34—4 closes, thereby energizing solenoid A to close the supply valve in the hydraulic system as previously described.

Emergency shut-down, such as is effected by the overspeed switch 292, may also be effected in response to any other emergency condition simply by placing the emergency controls in series with the switch 292 so that the opening of any one of the emergency switches will deenergize the solenoid B.

After emergency shut-down, it is necessary to perform certain manual operations to condition the apparatus for subsequent operation. The limit motor 65a must be run back to the 30° position by closing the manual switch 303 which energizes the motor through field winding 239 and switch 33a—3 (now closed). Motor 65s should also be run back to the 100% speed-no load position by means of manual switch 301.

Conclusion

It will be obvious that in a construction of a large wind turbine, of which the generator is of the synchronous type, the problem of control is vital. This is particularly true since, as has been hereinbefore pointed out, the structure of the wind is not uniform, being typically gusty. In a turbine design of this character, for location on a particular site, a definite gustiness pattern can be assumed. It is essential that the energy surges in the generator be greatly damped, in comparison with the energy surges in the gusts.

Free, or substantially free, coning of the blades assists materially in such damping, but in order that proper regulation may be had, it is essential that there be built into the turbine a unit inertia sufficiently high to produce a decided fly-wheel effect. Since it is also important for efficiency in operation that the solidarity factor of the turbine disc be not greater than 10 per cent with the blades at zero pitch, it follows that in generation of current in any considerable quantities (the range of 500 to 15,000 kw.) the disc diameter must be large, a blade radius of 50 to 200 feet being essential in order that sufficient power may be derived from the wind at lower wind velocities. This, in turn, requires a very considerable tower height, more particularly discussed hereinafter. Utilizing the standard index employed in hydraulic and steam turbine practice, the unit inertia should not be less than 4,000,000, where unit inertia is given by $$\frac{WR^2 (R.P.M.)^2}{H.P.}$$

in which W is in units of pounds, and R is in units of feet, and should not exceed 100,000,000.

With a turbine of such dimensions, there is a second factor which must be given consideration. Above a given site there is a constantly varying wind velocity at different levels in the possible range of disc location. The rise in velocity from ground level to a point approximately 20 feet above the terrain is extremely rapid with a much lowered increase in velocity from this point upwardly. It, therefore, follows that the ground clearance of the disc should be made at least 20 feet, thus assuring a much more uniform energy distribution in the disc. For this reason, the tower height should be made sufficient to provide this clearance, and with the blade radii given the tower should be at least 70 feet in height. While an increase in height of the tower will provide an increased efficiency in operation, the height should not exceed 250 feet even for a turbine disc of maximum proportions. The ratio of tower height to disc diameter should not exceed 1.8.

It may be here pointed out that the most advantageous sites available for turbines of this character are crests. At such a site, due to the slope of the intake, there is always a vertical component of the wind direction at the turbine. If this vertical component is sufficiently great at a site, the turbulence resulting from the vertical component becomes so great that the site cannot be economically occupied. For this reason, the selected site should have an intake slope of a mean angle not greater than 60 degrees and should, preferably, have a mean angle of approximately 30 degrees. It will be obvious that the inclination given the axis of the turbine by sloping the same downwardly up-wind means that the turbine disc will be presented to the wind at a much more efficient angle than if the axis were horizontal. Preferably, the shaft of the turbine should be arranged at an angle approximating the mean angle of the wind at the site, and certainly should not deviate therefrom more than 15°. In any event, the angle of the axis to the horizontal should be not less than 5 degrees. This angle may be increased to meet the mean angle of the wind to as high as 22 degrees.

It will be obvious that the construction illustrated is but one of many forms which the unit may assume. I do not, accordingly, wish to be understood as limiting myself to the specific structure herein illustrated except as hereinafter claimed.

I claim:

1. In a wind turbine, an elevated standard, a platform rotatable thereon, a wind motor carried by the platform and disposed down wind thereof, said wind motor comprising a shaft and variable pitch blades carried thereby, a fluid-pressure motor to vary the pitch of the blades, a governor controlling operation of said pitching motor, a fluid-pressure motor for rotating the platform upon the standard, a vane-operated valve for controlling operation of the platform rotating motor, and a fluid-pressure system common to said pitching and rotating motors and to the controls thereof.

2. In a wind turbine, an elevated standard, a platform rotatable thereon, a wind motor carried by the platform and disposed down-wind thereof, said wind motor comprising a shaft and variable pitch blades carried thereby, a fluid-pressure motor to vary the pitch of the blades, a governor controlling operation of said pitching motor, a fluid-pressure motor for rotating the platform upon the standard, a vane-operated valve for controlling operation of the platform rotating motor, a fluid-pressure system common to said pitching and rotating motors and to the controls thereof, a turbine-operated pump for maintaining pressure in said fluid-pressure system, and manually operable means for supplying fluid pressure directly to said pitching and rotating motors.

3. In wind turbine generating mechanism of the type described, an elevated standard, a wind motor mounted thereon and comprising radial blades, a turbine shaft mounting said blades, means to control the pitch of the blades, and pivotal connections between the blades and the shaft permitting said blades to independently cone in response to wind forces and centrifugal forces, said connections being constructed and arranged so that coning of said blades normally occurs in both positive and negative directions with respect to blade positions normal to the axis of said shaft and only in planes including the axis of said shaft, without regard to the pitch of the blades.

4. In wind turbine generating mechanism of the type described, an elevated standard, a wind motor mounted thereon and comprising radial blades, a turbine shaft mounting said blades, means to control the pitch of the blades, pivotal connections between the blades and the shaft permitting said blades to independently cone in response to wind forces and centrifugal forces, said connections being constructed and arranged so that coning of said blades normally occurs in both positive and negative directions with respect to blade positions normal to the axis of said shaft and only in planes including the axis of said shaft, without regard to the pitch of the blades, means associated with each blade yieldably resisting coning movement thereof, and means positively limiting coning of the blades in said positive and negative directions to predetermined maximum angular relations with respect to blade positions normal to the axis of the shaft.

5. In wind turbine generating mechanism of the type described, an elevated standard, a wind motor mounted thereon and comprising radial blades, a turbine shaft mounting said blades, means to control the pitch of the blades, pivotal connections between the blades and the shaft permitting said blades to independently cone in response to wind forces and centrifugal forces, said connections being constructed and arranged so that coning of said blades normally occurs in both positive and negative directions with respect to blade positions normal to the axis of said shaft and only in planes including the axis of said shaft, without regard to the pitch of the blades, and means associated with each blade yieldably resisting coning movement thereof, the elevated standard being not less than 70 feet in height nor more than 250 feet in height, the disc diameter of the turbine being not less than 100 feet nor more than 400 feet, and the clearance of the disc from the terrain being not less than 20 feet.

6. In wind turbine generating mechanism of the type described, an elevated standard, a wind motor mounted thereon and comprising radial blades, a turbine shaft mounting said blades, means to control the pitch of the blades, pivotal connections between the blades and the shaft permitting said blades to independently cone in response to wind forces and centrifugal forces, said connections being constructed and arranged so that coning of said blades normally occurs in both positive and negative directions with respect to blade positions normal to the axis of said shaft and only in planes including the axis of said shaft, without regard to the pitch of the blades, and means associated with each blade yieldably resisting coning movement thereof, the elevated standard being not less than 70 feet in height nor more than 250 feet in height, the disc diameter of the turbine being not less than 100 feet nor more than 400 feet, and the clearance of the disc from the terrain being not less than 20 feet, the turbine having a unit inertia of not less than 4,000,000, where the unit inertia is given by $$\frac{WR^2(R.P.M.)^2}{H.P.}$$

in which W is in units of pounds and R is in units of feet.

7. In a wind turbine, an elevated stationary supporting structure, a shaft rotatably mounted thereon in the general plane of wind direction, and a plurality of blades rotatable about their longitudinal axes to permit variation of the pitch thereof and pivotally connected to said shaft to permit said blades to cone in response to wind forces and centrifugal forces, the pivotal connections of said blades to the shaft being constructed and arranged so that independent coning of the blades may occur in both positive and negative directions with respect to blade positions normal to the axis of the shaft and only in planes including the axis of said shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind during each revolution of the turbine.

8. In a wind turbine, an elevated stationary supporting structure, a shaft rotatably mounted thereon in the general plane of wind direction, and a plurality of blades rotatable about their longitudinal axes to permit variation of the pitch thereof and pivotally connected to said shaft to permit said blades to cone independently in response to wind forces and centrifugal forces, the pivotal connections of said blades to the shaft being constructed and arranged so that coning of the blades may occur in both positive and negative directions and only in planes including the axis of said shaft, and the height of the supporting structure and the length of the blades being of such magnitude that said blades are subjected to significantly different wind forces in different portions of disc rotation, thereby causing said blades in portions of disc rotation in which the wind forces are lower to cone against the wind and in those portions in which the wind pressure is greater to cone with the wind, and means to control the pitch of said blades.

9. In a wind turbine, an elevated stationary supporting structure, a shaft rotatably mounted thereon in the general plane of wind direction, a plurality of variable pitch propeller blades pivotally connected to said shaft to permit said blades to independently cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind and in the other portion of disc rotation to cone in a negative direction against the wind during each revolution of the turbine, and means associated with each blade yieldably resisting coning movement thereof.

10. In a wind turbine, an elevated stationary supporting structure, a shaft rotatably mounted thereon in the general plane of wind direction, a plurality of blades pivotally connected to said shaft to permit said blades to independently cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of the shaft, the coning connections between said blades and shaft comprising bearings in which said blades are rotatable about their axes, and means to rotate the blades about their axes, and the height of the supporting structure and the length of the blades being of such magnitude that said blades are subjected to significantly different wind forces in different portions of disc rotation, thereby causing said blades in one portion of disc rotation to cone with the wind and in another portion of disc rotation to cone against the wind during each revolution of the turbine.

11. In a wind turbine, an elevated stationary supporting structure, a shaft rotatably mounted thereon in the general plane of wind direction, a plurality of blades pivotally connected to said shaft to permit said blades to independently cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, the coning connections between said blades and shaft comprising bearings in which said blades are rotatable about their axes, means to rotate the blades about their axes, and the height of the supporting structure and the length of the blades being of such magnitude that said blades are subjected to significantly different wind forces in different portions of disc rotation, thereby causing said blades in one portion of disc rotation to cone with the wind and in another portion of disc rotation to cone against the wind, and a governor-controlled means rotating the blades about their axes and thereby maintaining the speed of the shaft at a rate such that said coning movements occur during each revolution of the turbine.

12. In a wind turbine, an elevated stationary supporting structure, a shaft rotatably mounted thereon in the general plane of wind direction, a plurality of variable pitch propeller blades pivotally connected to said shaft to permit said blades to cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind during each revolution of the turbine, means associated with each blade yieldably resisting coning movement thereof, and means positively limiting coning of the blades in said positive and negative directions to predetermined maximum angular relations with respect to blade positions normal to the axis of the shaft.

13. In a wind turbine, an elevated stationary supporting structure, a shaft rotatably mounted thereon in the general plane of wind direction, and a plurality of blades rotatable about their longitudinal axes to permit variation of the pitch thereof and pivotally connected to said shaft to permit said blades to cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind during each revolution of the turbine, the turbine having a unit inertia index of not less than 4,000,000, where said index is given by $$\frac{WR^2(R.P.M.)^2}{H.P.}$$

in which W is the total weight in pounds of said turbine and R is the radius in feet of the blades.

14. In a wind turbine, an elevated stationary supporting structure, a shaft rotatably mounted thereon in the general plane of wind direction, and a plurality of blades rotatable about their longitudinal axes to permit variation of the pitch thereof and pivotally connected to said shaft to permit said blades to cone independently in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind during each revolution of the turbine, the axis of the shaft being so inclined that the tendency of the blades to up-wind coning normally is supplemented by gravity to a greater extent during movement of the blades through the latter named portion of the disc of rotation than during the remainder of their movement.

15. In a wind turbine, an elevated stationary supporting structure, a shaft rotatably mounted thereon in the general plane of wind direction, and a plurality of blades rotatable about their longitudinal axes to permit variation of the pitch thereof and pivotally connected to said shaft to permit said blades to cone in response to wind forces and centrifugal forces, the pivotal connections of said blades to the shaft being constructed and arranged so that independent coning of the blades may occur in both positive and negative directions with respect to blade positions normal to the axis of the shaft and only in planes including the axis of said shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind from blade positions normal to the shaft axis and in another portion of disc rotation to cone in a negative direction against the wind from blade positions normal to said shaft axis during each revolution of the turbine, the turbine having a unit inertia index of not less than 4,000,000 where said index is given by $$\frac{WR^2(R.P.M.)^2}{H.P.}$$

in which W is the total weight in pounds of said turbine and R is the radius in feet of the blades, the axis of the shaft being so inclined that the tendency of the blades to up-wind coning normally is supplemented by gravity to a greater extent during movement of the blades through the latter portion of the disc of rotation than during the remainder of their movement.

16. In wind turbine generating mechanism of the type described, an elevated standard, a wind motor mounted thereon and comprising radial blades and a turbine shaft mounting said blades, pivotal connections between the blades and the shaft permitting said blades to cone in response to wind forces and centrifugal forces, said connections being constructed and arranged so that coning of said blades occurs in both positive and negative directions with respect to blade positions normal to the axis of said shaft and only in planes including the axis of said shaft, means associated with each blade yieldably resisting coning movement thereof, said blades being rotatable about their longitudinal axes, and speed-responsive means for simultaneously rotating said blades.

17. In wind turbine generating mechanism of the type described, an elevated standard, a wind motor mounted thereon and comprising radial blades and a turbine shaft mounting said blades, pivotal connections between the blades and the shaft permitting said blades to cone in response to wind forces and centrifugal forces, said connections being constructed and arranged so that coning of said blades occurs in both positive and negative directions with respect to blade positions normal to the axis of said shaft and only in planes including the axis of said shaft, the pivotal connections of said blades being constructed and arranged to permit rotation of the blades about their longitudinal axes to vary the pitch, and a governor controlling the rotative position of the blades to thereby control the speed of the turbine.

18. In a wind turbine, an elevated stationary supporting structure, a shaft rotatably mounted thereon in the general plane of wind direction, and a plurality of blades pivotally connected to said shaft to permit said blades to cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind from blade positions normal to said shaft axis during each revolution of the turbine, the pivotal connections of said blades being constructed and arranged to permit rotation of the blades about their longitudinal axes to vary the pitch, and a governor controlling the rotative position of the blades to control the speed of the turbine.

19. In a wind turbine, an elevated stationary supporting structure, a shaft rotatably mounted thereon in the general plane of wind direction, and a plurality of blades pivotally connected to said shaft to permit said blades to cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind during each revolution of the turbine, the axis of the shaft being so inclined that the tendency of the blades to up-wind coning normally is supplemented by gravity to a greater extent during movement of the blades through the latter portion of the disc of rotation than during the remainder of their movement, the pivotal connections of said blades being constructed and arranged to permit rotation of the blades about their longitudinal axes to vary the pitch, and a governor controlling the rotative position of the blades and thereby the speed of the turbine.

20. In a wind turbine, an elevated stationary supporting structure, a shaft rotatably mounted thereon in the general plane of wind direction, and a plurality of blades rotatable about their longitudinal axes to permit variation of the pitch thereof and pivotally connected to said shaft to permit said blades to cone in response to wind forces and centrifugal forces, the pivotal connections of said blades to the shaft being constructed and arranged so that coning of the blades may occur independently in both positive and negative directions with respect to blade positions normal to the axis of the shaft and only in planes including the axis of said shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind during each revolution of the turbine, and power driven automatic yawing means operable to maintain the shaft axis in alignment with the wind.

21. In wind turbine generating mechanism of the type described, an elevated standard, a wind motor mounted thereon and comprising variable pitch radial blades, a turbine shaft mounting said blades, means to control the pitch of the blades, and pivotal connections between the blades and the shaft permitting said blades to independently cone in response to wind forces and centrifugal forces, said connections being constructed and arranged so that coning of said blades normally occurs in both positive and negative directions with respect to blade positions normal to the axis of said shaft and only in planes including the axis of said shaft, without regard to the pitch of the blades, the axis of the turbine shaft being so inclined that the coning movement of the blades in the negative direction is supplemented to a greater extent by gravity than the movement thereof in the positive direction.

22. In wind turbine generating mechanism of the type described, an elevated standard, a wind motor mounted thereon and comprising variable pitch radial blades, a turbine shaft mounting said blades, means to control the pitch of the blades, pivotal connections between the blades and the shaft permitting said blades to independently cone in response to wind forces and centrifugal forces, said connections being constructed and arranged so that coning of said blades normally occurs in both positive and negative directions with respect to blade positions normal to the axis of said shaft and only in planes including the axis of said shaft, without regard to the pitch of the blades, means associated with each blade yieldably resisting coning movement thereof, and means positively limiting coning of the blades in said positive and negative directions to predetermined maximum angular relations with respect to blade positions normal to the axis of the shaft, the axis of the turbine shaft being so inclined that the coning movement of the blades in the negative direction is supplemented to a greater extent by gravity than the movement thereof in the positive direction.

23. In wind turbine generating mechanism of the type described, an elevated standard, a wind motor mounted thereon and comprising variable pitch radial blades, a turbine shaft mounting said blades, means to control the pitch of the blades, and pivotal connections between the blades and the shaft permitting said blades to independently cone in response to wind forces and centrifugal forces, said connections being constructed and arranged so that coning of said blades normally occurs in both positive and negative directions with respect to blade positions normal to the axis of said shaft.

24. In a wind turbine, an elevated stationary supporting structure, a shaft rotatably mounted thereon in the general plane of wind direction, a plurality of blades pivotally connected to said shaft to permit said blades to independently cone in response to wind forces and centrifugal forces, the pivotal connections of said blades to the shaft being constructed and arranged so that coning of the blades may occur in both positive and negative directions with respect to blade positions normal to the axis of the shaft, the coning connections between said blades and shaft comprising bearings in which said blades are rotatable about their axes, means to rotate the blades about their axes, and the height of the supporting structure and the length of the blades being of such magnitude that said blades are subjected to significantly different wind forces in different portions of disc rotation, thereby causing said blades in one portion of disc rotation to cone with the wind and in another portion of disc rotation to cone against the wind, and a governor-controlled means rotating the blades about their axes and thereby maintaining the speed of the shaft at a rate such that said coning movements occur during each revolution of the turbine.

25. In a wind turbine, an elevated stationary supporting structure, a shaft rotatably mounted thereon in the general plane of wind direction, and a plurality of blades rotatable about their longitudinal axes to permit variation of the pitch thereof and pivotally connected to said shaft to permit said blades to cone independently in response to wind forces and centrifugal forces, the pivotal connections of said blades to the shaft being constructed and arranged so that coning of the blades may occur in both positive and negative directions with respect to blade positions normal to the axis of the shaft, without regard to the pitch of the blades, and the height of the supporting structure and the length of the blades being of such magnitude that said blades are subjected to significantly different wind forces in different portions of disc rotation, thereby causing said blades in one portion of disc rotation to cone in a positive direction with the wind and in another portion of disc rotation to cone in a negative direction against the wind during each revolution of the turbine, the axes of the shaft being so inclined that the tendency of the blades to up-wind coning normally is supplemented by gravity to a greater extent during movement of the blades through the latter named portion of the disc of rotation than during the remainder of their movement.

26. In a wind turbine, an elevated stationary supporting structure, a base mounted upon the support for rotation about a vertical axis, a shaft rotatably mounted on said base in the general plane of wind direction, automatic yawing means to maintain a given end of said shaft headed into the wind, and a plurality of blades pivotally connected to said shaft to permit said blades to cone independently in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, and the height of the supporting structure and the length of the blades being of such magnitude that said blades are subjected to significantly different wind forces in different portions of disc rotation, thereby causing said blades in portions of disc rotation in which the wind forces are lower to cone against the wind and in those portions in which the wind pressure is greater to cone with the wind.

27. In a wind turbine, an elevated stationary supporting structure, a base mounted upon the support for rotation about a vertical axis, a shaft rotatably mounted on said base in the general plane of wind direction, automatic yawing means to maintain a given end of said shaft headed into the wind, a plurality of blades pivotally connected to said shaft to permit said blades to cone independently in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, and the height of the supporting structure and the length of the blades being of such magnitude that said blades are subjected to significantly different wind forces in different portions of disc rotation, thereby enabling said blades in portions of disc rotation in which the wind forces are lower to cone against the wind and in those portions in which the wind pressure is greater to cone with the wind, and means maintaining the speed of said shaft at a rate such that said coning movements of the shaft occur in each revolution of the shaft.

28. In a wind turbine, an elevated stationary supporting structure, a base mounted upon the support for rotation about a vertical axis, a shaft rotatably mounted on said base in the general plane of wind direction, automatic yawing means to maintain a given end of said shaft headed into the wind, a plurality of blades pivotally connected to said shaft to permit said blades to cone in response to wind forces and centrifugal forces, the pivotal connections of said blades to the shaft being constructed and arranged so that coning of the blades may occur in both positive and negative directions with respect to blade positions normal to the axis of the shaft and only in planes including the axis of said shaft, and the height of the supporting structure and the length of the blades being of such magnitude that said blades are subjected to significantly different wind forces in different portions of disc rotation, thereby causing said blades in one portion of disc rotation to cone in a positive direction with the wind from blade positions normal to the shaft axis and in another portion of disc rotation to cone in a negative direction against the wind from blade positions normal to said shaft axis during each revolution of the turbine, means associated with each blade yieldably resisting coning movement thereof, and means positively limiting coning of the blades in said positive and negative directions to predetermined maximum angular relations with respect to blade positions normal to the axis of the shaft.

PALMER COSSLETT PUTNAM.